(12) United States Patent
Abedini et al.

(10) Patent No.: US 11,751,224 B2
(45) Date of Patent: Sep. 5, 2023

(54) SYNCHRONIZATION SIGNAL BLOCK RESOURCE SELECTION ACCORDING TO MOBILITY STATE

(71) Applicant: QUALCOMM Incorporated, San Diego, CA (US)

(72) Inventors: Navid Abedini, Somerset, NJ (US); Jianghong Luo, Skillman, NJ (US); Karl Georg Hampel, Hoboken, NJ (US); Luca Blessent, Whitehouse Station, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 189 days.

(21) Appl. No.: 16/947,630

(22) Filed: Aug. 11, 2020

(65) Prior Publication Data

US 2021/0058917 A1 Feb. 25, 2021

Related U.S. Application Data

(60) Provisional application No. 62/890,453, filed on Aug. 22, 2019.

(51) Int. Cl.
*H04W 72/04* (2023.01)
*H04W 72/51* (2023.01)
(Continued)

(52) U.S. Cl.
CPC ......... *H04W 72/51* (2023.01); *H04W 72/044* (2013.01); *H04W 72/29* (2023.01); *H04W 88/085* (2013.01)

(58) Field of Classification Search
CPC ........... H04W 72/048; H04W 72/0433; H04W 72/044; H04W 88/085; H04W 16/14;
(Continued)

(56) References Cited

U.S. PATENT DOCUMENTS 11,218,921 B2 1/2022 Luo et al.
2017/0359714 A1 12/2017 Gupta et al.
(Continued)

FOREIGN PATENT DOCUMENTS

WO 2020086316 A1 4/2020

OTHER PUBLICATIONS

ERICSSON: "SSB-Based IAB node Discovery and Measurement", 3GPP Draft, 3GPP TSG-RAM WG1 #96-Bis, R1-1904832, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Mar. 29, 2019 (Mar. 29, 2019), XP051691787, 8 pages, Retrieved from the Internet: URL: http://www.3gpp.org/ftp/tsg%5Fran/WG1%5FRL1/TSGR1%5F96b/Docs/R1%2D1904832%2Ezip. [retrieved on Mar. 29, 2019] paragraphs [0001]-[0003].
(Continued)

*Primary Examiner* — Ricardo H Castaneyra
(74) *Attorney, Agent, or Firm* — Harrity & Harrity, LLP/QUALCOMM Incorporated

(57) ABSTRACT

Various aspects of the present disclosure generally relate to wireless communication. In some aspects, an integrated access and backhaul (IAB) node may identify one or more resources for transmitting one or more synchronization signal blocks (SSBs), the one or more resources being associated with a mobility state of the IAB node. The IAB node may transmit the one or more SSBs in the one or more resources. Numerous other aspects are provided.

53 Claims, 11 Drawing Sheets

(51) Int. Cl.
*H04W 72/044* (2023.01)
*H04W 72/29* (2023.01)
*H04W 88/08* (2009.01)

(58) Field of Classification Search
CPC .. H04W 16/10; H04W 72/51; H04B 7/15542; H04L 5/0048
See application file for complete search history.

(56) References Cited

U.S. PATENT DOCUMENTS

| | | | |
|---|---|---|---|
| 2019/0350023 A1 | 11/2019 | Novlan et al. | |
| 2019/0363809 A1* | 11/2019 | Yoon | H04W 56/00 |
| 2020/0052843 A1 | 2/2020 | Cheng et al. | |
| 2020/0084819 A1 | 3/2020 | Abedini et al. | |
| 2020/0107383 A1 | 4/2020 | Novlan et al. | |
| 2020/0229115 A1* | 7/2020 | Qi | H04W 56/001 |
| 2021/0014777 A1* | 1/2021 | You | H04W 40/24 |
| 2021/0044958 A1 | 2/2021 | Abedini et al. | |
| 2021/0051557 A1 | 2/2021 | Abedini et al. | |
| 2021/0051558 A1 | 2/2021 | Abedini et al. | |
| 2021/0058854 A1 | 2/2021 | Luo et al. | |
| 2021/0298055 A1* | 9/2021 | Harada | H04W 72/1289 |

OTHER PUBLICATIONS

International Search Report and Written Opinion—PCT/US2020/070400—ISA/EPO—dated Nov. 2, 2020.

Lenovo, et al., "Discussion on Discovery and Measurement for IAB Network", 3GPP Draft, 3GPP TSG RAN WG1 #96, R1-1902154, SSB, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 15, 2019 (Feb. 15, 2019), XP051599849, 3 pages, Retrieved from the Internet: URL: http://www.3gpp.org/ftp/tsg%5Fran/WG1%5FRL1/TSGR1%5F96/Docs/R1%2D1902154%2Ezip. [retrieved on Feb. 15, 2019] paragraphs [02.1]-[02.2].

Nokia, et al., "Discovery and Measurements for IAB", 3GPP Draft, 3GPP TSG RAN WG1 Meeting #94-bis, R1-1810677, IAB Discovery and Measurements, 3rd Generation Partnership Project (3GPP), Mobile Competence Centre, 650, Route Des Lucioles, F-06921 Sophia-Antipolis Cedex, France, vol. RAN WG1, No. Chengdu, P.R. China, Oct. 8, 2018-Oct. 12, 2018, Sep. 28, 2018 (Sep. 28, 2018), XP051518081, 7 pages, Retrieved from the Internet: URL: http://www.3gpp.org/ftp/tsg%5Fran/WG1%5FRL1/TSGR1%5F94b/Docs/R1%2D1810677%2Ezip. [retrieved on Sep. 28, 2018] paragraph [02.3]; figure 4.

* cited by examiner

SYNCHRONIZATION SIGNAL BLOCK RESOURCE SELECTION ACCORDING TO MOBILITY STATE

CROSS-REFERENCE TO RELATED APPLICATION

This Patent Application claims priority to U.S. Provisional Patent Application No. 62/890,453, filed on Aug. 22, 2019, entitled "SYNCHRONIZATION SIGNAL BLOCK RESOURCE SELECTION ACCORDING TO MOBILITY STATE," and assigned to the assignee hereof. The disclosure of the prior Application is considered part of and is incorporated by reference into this Patent Application.

INTRODUCTION

Aspects of the present disclosure generally relate to wireless communication and to techniques and apparatuses for communication based at least in part on a mobility state of a network node.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a network node, may include identifying one or more resources for receiving one or more synchronization signal blocks (SSBs), the one or more resources being associated with a mobility state of an integrated access and backhaul (IAB) node; and receiving, from the IAB node, the one or more SSBs in the one or more resources.

In some aspects, a method of wireless communication, performed by an IAB node, may include identifying one or more resources for transmitting one or more SSBs, the one or more resources being associated with a mobility state of the IAB node; and transmitting the one or more SSBs in the one or more resources.

In some aspects, a method of wireless communication, performed by a network node, may include selecting one or more resources for an IAB node to transmit one or more SSBs, the one or more resources being associated with a mobility state of the IAB node; and transmitting an indication of the one or more resources to enable the IAB node to transmit the one or more SSBs using the one or more resources.

In some aspects, a network node for wireless communication may include memory and one or more processors coupled to the memory. The memory and the one or more processors may be configured to identify one or more resources for receiving one or more SSBs, the one or more resources being associated with a mobility state of an IAB node; and receive, from the IAB node, the one or more SSBs in the one or more resources.

In some aspects, an IAB node for wireless communication may include memory and one or more processors coupled to the memory. The memory and the one or more processors may be configured to identify one or more resources for transmitting one or more SSBs, the one or more resources being associated with a mobility state of the IAB node; and transmit the one or more SSBs in the one or more resources.

In some aspects, a network node for wireless communication may include memory and one or more processors coupled to the memory. The memory and the one or more processors may be configured to select one or more resources for an IAB node to transmit one or more SSBs, the one or more resources being associated with a mobility state of the IAB node; and transmit an indication of the one or more resources to enable the IAB node to transmit the one or more SSBs using the one or more resources.

In some aspects, a non-transitory computer-readable medium may store one or more instructions for wireless communication. The one or more instructions, when executed by one or more processors of a network node, may cause the one or more processors to identify one or more resources for receiving one or more SSBs, the one or more resources being associated with a mobility state of an IAB node; and receive, from the IAB node, the one or more SSBs in the one or more resources.

In some aspects, a non-transitory computer-readable medium may store one or more instructions for wireless communication. The one or more instructions, when executed by one or more processors of an IAB node, may cause the one or more processors to identify one or more resources for transmitting one or more SSBs, the one or more resources being associated with a mobility state of the IAB node; and transmit the one or more SSBs in the one or more resources.

In some aspects, a non-transitory computer-readable medium may store one or more instructions for wireless communication. The one or more instructions, when executed by one or more processors of a network node, may cause the one or more processors to select one or more resources for an IAB node to transmit one or more SSBs, the one or more resources being associated with a mobility state of the IAB node; and transmit an indication of the one or more resources to enable the IAB node to transmit the one or more SSBs using the one or more resources.

In some aspects, an apparatus for wireless communication may include means for identifying one or more resources for receiving one or more SSBs, the one or more resources being associated with a mobility state of an IAB node; and means for receiving, from the IAB node, the one or more SSBs in the one or more resources.

In some aspects, an apparatus for wireless communication may include means for identifying one or more resources for transmitting one or more SSBs, the one or more resources being associated with a mobility state of the apparatus; and means for transmitting the one or more SSBs in the one or more resources.

In some aspects, an apparatus for wireless communication may include means for selecting one or more resources for an IAB node to transmit one or more SSBs, the one or more resources being associated with a mobility state of the IAB node; and means for transmitting an indication of the one or more resources to enable the IAB node to transmit the one or more SSBs using the one or more resources.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
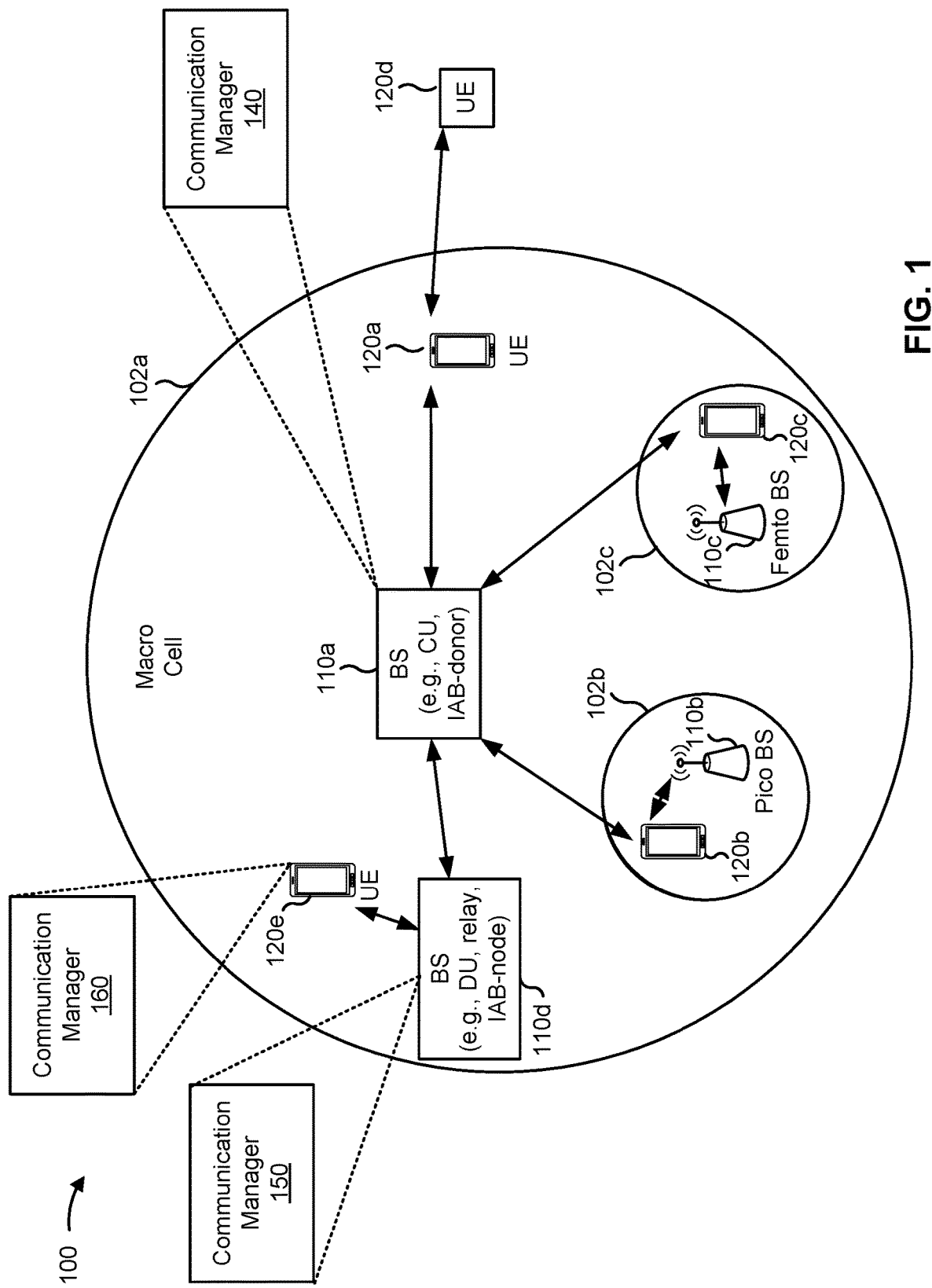
FIG. 1 is a block diagram conceptually illustrating an example of a wireless communication network, in accordance with various aspects of the present disclosure.

In some communications systems, such as 5G communications systems that use multi-hop networks (e.g., integrated access and backhauling (IAB)), a central unit (CU)—distributed unit (DU) architecture may be used. For example, an IAB-donor may be hierarchically connected to a set of IAB-nodes, a set of UEs, and/or the like. Each device in such a network may be referred to, generally, as a network node.

Different network nodes may be associated with different mobility states, which may correspond to different levels of mobility (e.g., different speeds at which a network node is traveling or is capable of traveling). For example, an IAB-donor may be configured as a stationary network node. In contrast, a UE may be a mobile network node, and may be associated with a particular level of mobility, such as a low level of mobility (e.g., movement at a relatively low speed, such as pedestrian-based movement), a medium level of mobility (e.g., movement at a relatively medium speed, such as automobile-based movement), or a high level of mobility (e.g., movement at a relatively high speed, such as high speed rail-based movement). An IAB-node may be associated with a stationary mobility state, a mobile mobility state (e.g., a low level, medium level, or high level of mobility), and/or the like.

Although some aspects are described in terms of particular types of mobility states (e.g., stationary, low mobility, medium mobility, high mobility, and/or the like), other types of mobility states are contemplated.

In some cases, a network node may change mobility states. For example, a UE may transition from a high level of mobility to a low level of mobility based at least in part on, for example, a user of the UE exiting a high speed rail transportation modality and continuing using a pedestrian transportation modality. Similarly, an IAB-node may transition from a mobile state to a stationary state when a speed of movement of the IAB-node is less than a threshold. For example, an IAB-node in an automobile may have a medium level of mobility while the automobile is moving and a stationary level of mobility when the automobile is parked. In this case, a threshold for distinguishing the medium level of mobility and the stationary level of mobility may be a single threshold at a particular speed, a plurality of thresholds (e.g., a first threshold for transitioning from medium to low levels of mobility and a second threshold for transitioning from low to stationary levels of mobility), and/or the like.

A network node (e.g., an IAB-donor or an IAB-node) may transmit a set of SSB transmissions (e.g., an SSB burst set) to enable another network node (e.g., an IAB-node or a UE) to perform an initial access procedure, a cell selection procedure, a neighbor-cell search procedure, a peer discovery procedure, a measurement procedure, and/or the like. The SSB transmissions may include information associated with the network node, such as a physical cell identifier (PCI) associated with the network node. In some cases, a mobile network node may travel into an area associated with another network node (e.g., a stationary network node). In such cases, SSB transmissions of the mobile network node and the other network node may collide. For example, the mobile network node and the other network node may be associated with the same PCI, and may transmit SSB transmissions in the same resources, thereby resulting in PCI collision and unsuccessful communication.

Some techniques and apparatuses described herein enable a network node to use particular resources for SSB transmissions according to a mobility state of the network node (e.g., a mobility state of a cell associated with the network node). For example, a network node (e.g., an IAB-node) may identify resources for transmitting SSBs that are selected according to a mobility state of the network node (e.g., a mobility state of a cell associated with the network node), and may transmit the SSBs in the selected resources. In this way, mobile network nodes and stationary network nodes may use different resources (e.g., time resources and/or frequency resources) for transmitting SSBs, thereby improving avoidance of PCI collisions and improving successful communication between network nodes.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a wireless network 100 in which aspects of the present disclosure may be practiced. The wireless network 100 may be an LTE network, a 5G or NR network, and/or the like. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

As shown in FIG. 1, a BS 110 (e.g., a central unit (CU) or an IAB-donor, such as BS 110a) may include a communication manager 140. As described in more detail elsewhere herein, the communication manager 140 may provide means for identifying one or more resources for transmitting one or more SSBs, the one or more resources being associated with a mobility state of the BS 110, and means for transmitting the one or more SSBs in the one or more resources. In some aspects, as described in more detail elsewhere herein, the communication manager 140 may provide means for selecting one or more resources for an IAB node to transmit one or more SSBs, the one or more resources being associated with a mobility state of the IAB node, and means for transmitting an indication of the one or more resources to enable the IAB node to transmit the one or more SSBs using the one or more resources. Additionally, or alternatively, the communication manager 140 may provide means for performing one or more other operations described herein.

Similarly, a BS 110 (e.g., a distributed unit (DU), a relay, or an IAB-node, such as BS 110d) may include a communication manager 150. As described in more detail elsewhere herein, the communication manager 150 may provide means for identifying one or more resources for transmitting one or more SSBs, the one or more resources being associated with a mobility state of the BS 110, and means for transmitting the one or more SSBs in the one or more resources. In some aspects, as described in more detail elsewhere herein, the communication manager 150 may provide means for identifying one or more resources for receiving one or more SSBs, the one or more resources being associated with a mobility state of an IAB node, and means for receiving, from the IAB node, the one or more SSBs in the one or more resources. Additionally, or alternatively, the communication manager 150 may provide means for performing one or more other operations described herein.

Similarly, a UE 120 (e.g., UE 120e) may include a communication manager 160. As described in more detail elsewhere herein, the communication manager 160 may provide means for identifying one or more resources for receiving one or more SSBs, the one or more resources being associated with a mobility state of an IAB node, and means for receiving, from the IAB node, the one or more SSBs in the one or more resources. Additionally, or alternatively, the communication manager 160 may provide means for performing one or more other operations described herein.

As indicated above, FIG. 1 is provided merely as an example. Other examples may differ from what is described with regard to FIG. 1.

Figure 2:
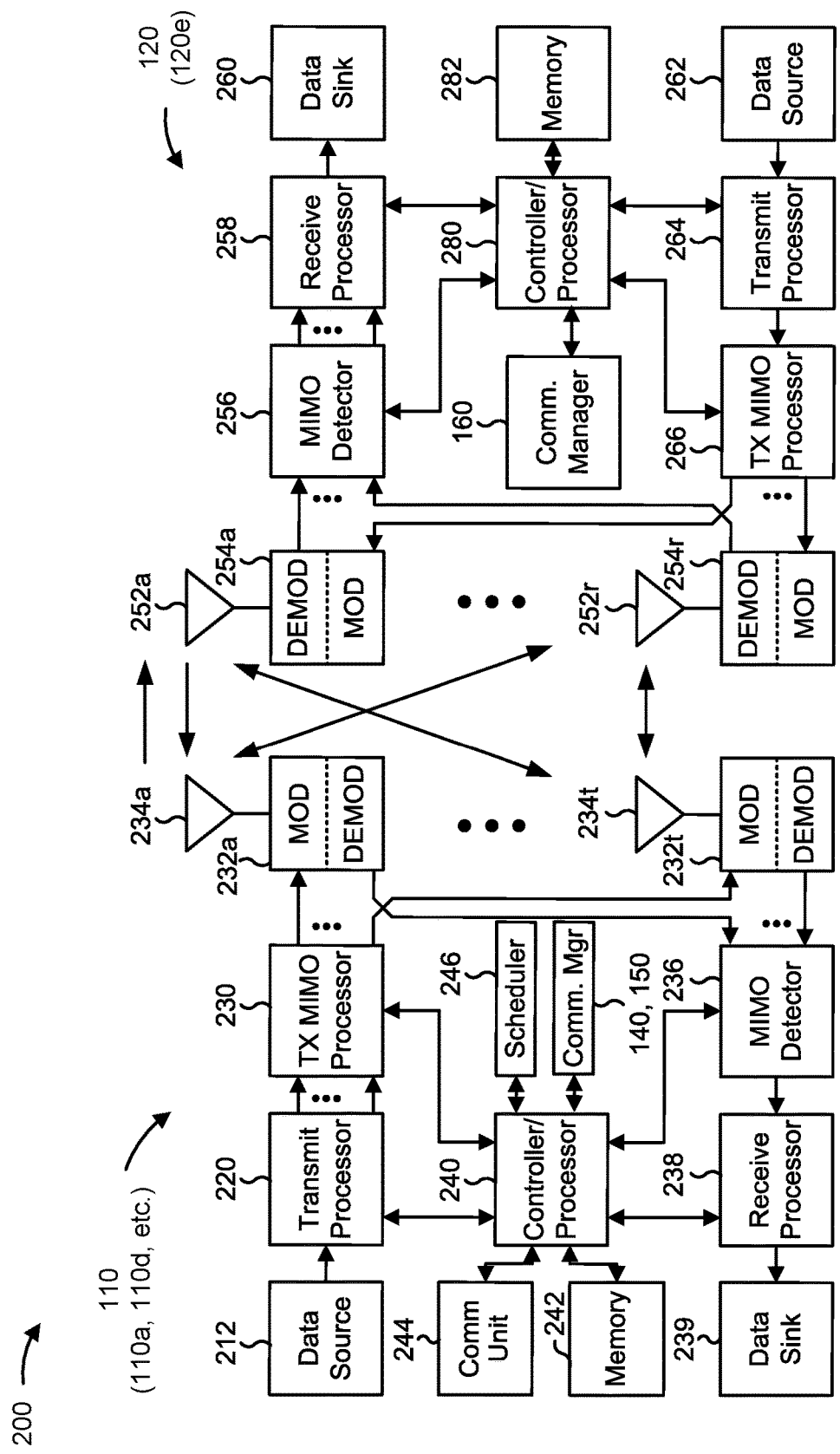
FIG. 2 is a block diagram conceptually illustrating an example of a base station in communication with a UE in a wireless communication network, in accordance with various aspects of the present disclosure.

FIG. 2 shows a block diagram of a design 200 of base station 110 (e.g., a network node) and UE 120 (e.g., a network node), which may be one of the base stations and one of the UEs in FIG. 1. Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may provide means for transmitting data or control information, among other examples, to, for example, UE 120. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The controller/processor 280 may provide, for UE 120, means for determining, identifying, or selecting, among other examples, such as using a determination circuit, an identification circuit, a selection circuit, and/or the like. The receive processor 258 may provide, for UE 120, means for receiving data or control information, among other examples, from, for example, BS 110. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. The transmit processor 264 may provide, for UE 120, means for transmitting data or control information, among other examples, to, for example, BS 110. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide, for BS 110, means for receiving data or control information, among other examples, from, for example, UE 120. Receive processor 238 may provide the decoded data to a data sink 239 and the decoded control information to controller/processor 240. The controller/processor 240 may provide means for, for example, determining, selecting, identifying, or detecting, among other examples. Base station 110 may include communication unit 244.

Controller/processor 240 of base station 110, controller/processor 280 of UE 120, and/or any other component(s) of FIG. 2 may perform one or more techniques associated with selecting SSB resources according to mobility state, as described in more detail elsewhere herein. For example, controller/processor 240 of base station 110, controller/processor 280 of UE 120, and/or any other component(s) of FIG. 2 may perform or direct operations of, for example, process 500 of FIG. 5, process 600 of FIG. 6, process 700 of FIG. 7, and/or other processes as described herein. Memories 242 and 282 may store data and program codes for base station 110 and UE 120, respectively. A scheduler 246 may schedule UEs for data transmission on the downlink and/or uplink.

In some aspects, the UE 120 (e.g., a network node, and/or the like) may include means for identifying (e.g., using controller/processor 280, memory 282, and/or the like) one or more resources for receiving one or more SSBs, the one or more resources being associated with a mobility state of an IAB node, means for receiving (e.g., using antenna 252, DEMOD 254, MIMO detector 256, receive processor 258, controller/processor 280, and/or the like), from the IAB node, the one or more SSBs in the one or more resources, and/or the like. Additionally, or alternatively, the UE 120 may include means for performing one or more other operations described herein. In some aspects, such means may include the communication manager 160. Additionally, or alternatively, such means may include one or more components of the UE 120 described in connection with FIG. 2.

In some aspects, the base station 110 (e.g., a network node, an IAB node, an IAB donor, and/or the like) may include means for identifying (e.g., using controller/processor 240, memory 242, and/or the like) one or more resources for transmitting one or more SSBs, the one or more resources being associated with a mobility state of the base station 110, means for transmitting (e.g., using controller/processor 240, transmit processor 220, TX MIMO processor 230, MOD 232, antenna 234, and/or the like) the one or more SSBs in the one or more resources, means for identifying (e.g., using controller/processor 240, memory 242, and/or the like) one or more resources for receiving one or more SSBs, the one or more resources being associated with a mobility state of an IAB node, means for receiving (e.g., using antenna 234, DEMOD 232, MIMO detector 236, receive processor 238, controller/processor 240, and/or the like), from the IAB node, the one or more SSBs in the one or more resources, and/or the like. Additionally, or alternatively, the base station 110 may include means for performing one or more other operations described herein. In some aspects, such means may include the communication manager 150. In some aspects, such means may include one or more components of the base station 110 described in connection with FIG. 2.

In some aspects, the base station 110 (e.g., a network node, an IAB donor, and/or the like) may include means for selecting (e.g., using controller/processor 240, memory 242, and/or the like) one or more resources for an IAB node to transmit one or more SSBs, the one or more resources being associated with a mobility state of the IAB node, means for transmitting (e.g., using controller/processor 240, transmit processor 220, TX MIMO processor 230, MOD 232, antenna 234, and/or the like) an indication of the one or more resources to enable the IAB node to transmit the one or more SSBs using the one or more resources, means for identifying (e.g., using controller/processor 240, memory 242, and/or the like) one or more resources for transmitting one or more SSBs, the one or more resources being associated with a mobility state of the base station 110, means for transmitting (e.g., using controller/processor 240, transmit processor 220, TX MIMO processor 230, MOD 232, antenna 234, and/or the like) the one or more SSBs in the one or more resources, and/or the like. Additionally, or alternatively, the base station 110 may include means for performing one or more other operations described herein. In some aspects, such means may include the communication manager 140. In some aspects, such means may include one or more components of the base station 110 described in connection with FIG. 2.

As indicated above, FIG. 2 is provided merely as an example. Other examples may differ from what is described with regard to FIG. 2.

Figure 3A:
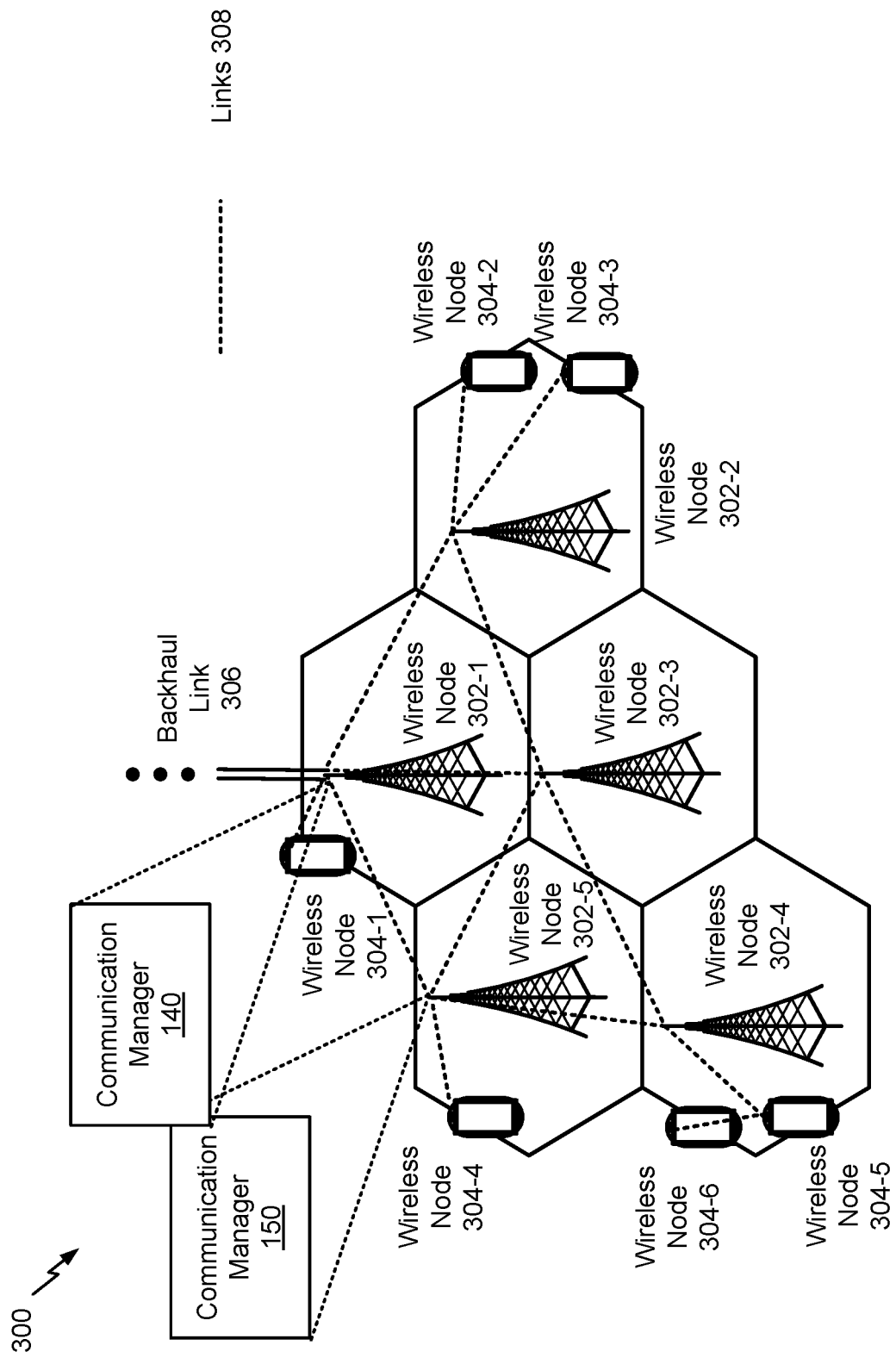
FIGS. 3A and 3B are diagrams illustrating an example of a network topology for a multi-hop network, in accordance with various aspects of the present disclosure.
Figure 3B:
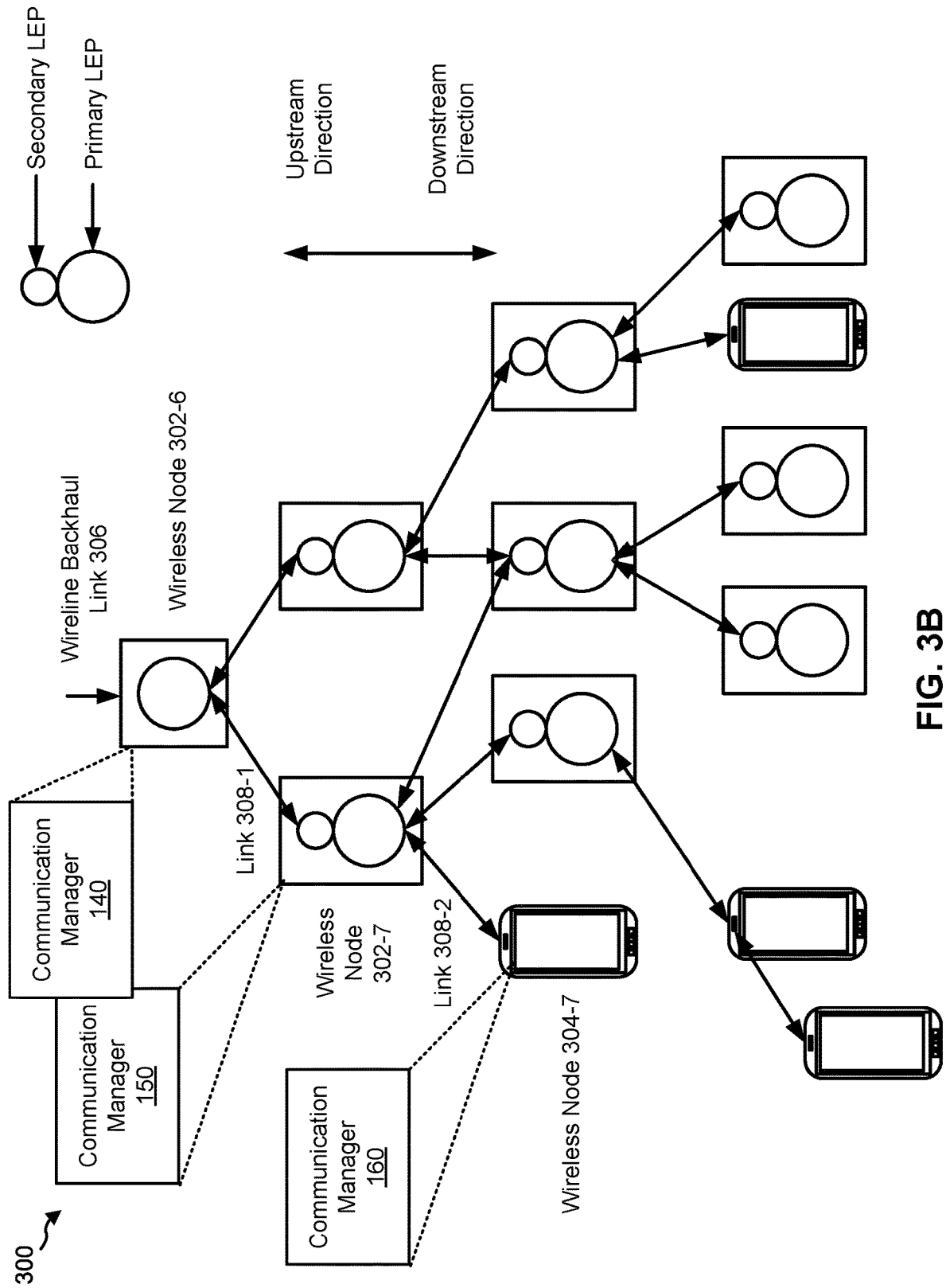

FIGS. 3A and 3B are diagrams illustrating an example 300 of a network topology for a network, in accordance with various aspects of the present disclosure. Self-backhauling or IAB may be deployed to use a common set of resources for access traffic and backhaul traffic. For example, a first wireless node (e.g., BS 110a, BS 110d, and/or the like) may communicate backhaul traffic (e.g., SSBs) with a second wireless node and may communicate access traffic (e.g., SSBs) with a third wireless node. Although some aspects described herein are described in terms of an IAB deployment, some aspects described herein may be used in connection with other types of multi-hop networks.

As shown in FIG. 3A, example 300 may include multiple wireless nodes 302 (e.g., BSs) and multiple wireless nodes 304 (e.g., UEs). At least one wireless node (e.g., wireless node 302-1, which may be a CU, such as BS 110a) may communicate with a core network via a backhaul link 306, such as a fiber connection, a wireless backhaul connection, a combination thereof, and/or the like. Wireless nodes 302 and 304 may communicate with each other using a set of links 308, such as a set of millimeter wave (mmWave) links; a 3G, 4G, 5G, etc. air interface; any future wireless network (e.g., a 6G wireless network); and/or the like. The wireless nodes 302, which may be network nodes, may be associated with different mobility states, such as stationary mobility states, mobile mobility states (e.g., a high level of mobility, a low level of mobility, etc.), and/or the like.

As further shown in FIG. 3A, one or more wireless nodes 302 or 304 may communicate indirectly via one or more other wireless nodes 302 or 304. For example, data may be transferred from a core network to wireless node 304-4 via backhaul link 306, a link 308 between wireless node 302-1 (e.g., BS 110a) and wireless node 302-5 (e.g., which may be a DU, such as BS 110d), and a link 308 between wireless node 302-5 and wireless node 304-4 (e.g., which may be a UE, such as UE 120e).

As shown in FIG. 3B, wireless nodes 302 and wireless nodes 304 can be arranged in a hierarchical topology to enable management of network resources. Each link 308 may be associated with a primary link end point (primary LEP, which may also be referred to as a serving LEP, a controlling/controller LEP, a principal LEP, a main LEP, a managing LEP, an administering LEP, and/or the like) and a secondary link end point (secondary LEP, which may also be referred to as a served LEP, a controlled/controlee LEP, a subordinate LEP, a subsidiary LEP, a managed LEP, an administered LEP, and/or the like), which may define a hierarchy between wireless nodes 302 or 304. For example, a wireless node 302-6 (e.g., which may be a CU, such as BS 110a) may communicate with a wireless node 302-7 (e.g., which may be a DU, such as BS 110d, that is a child node or inferior node of wireless node 302-6) via link 308-1, which may be a parent link for wireless node 302-7. In this case, wireless node 302-6 may provide configuration information, such as a communication configuration, a rule for determining a communication configuration, and/or the like. Additionally, or alternatively, wireless node 302-6 may provide, to wireless node 302-7, information regarding a mobility state of a child node of wireless node 302-7 (e.g., based at least in part on mobility information received from a core network). Similarly, wireless node 302-7 may communicate with wireless node 304-7 (e.g., which may be a UE, such as UE 120e, which may be a child node or inferior node of wireless node 302-7) via link 308-2, which may be a child link for wireless node 302-7. In this case, wireless node 302-6 may schedule for wireless node 302-7, which may schedule for wireless node 304-7 based at least in part on the hierarchy defined herein.

As indicated above, FIGS. 3A and 3B are provided as examples. Other examples are possible and may differ from what was described with respect to FIGS. 3A and 3B.

Figure 4:
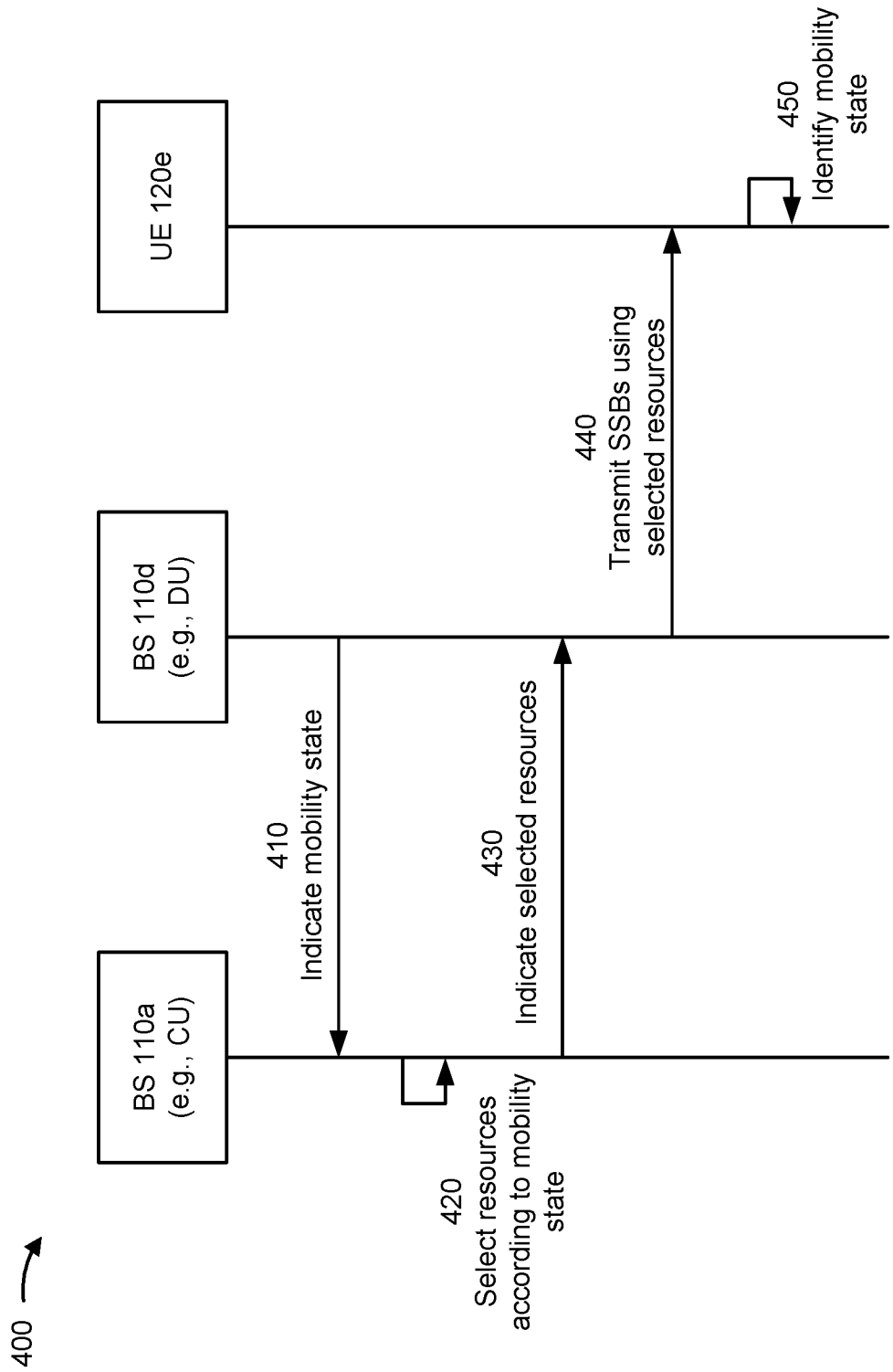
FIG. 4 is a diagram illustrating an example of selecting SSB resources according to mobility state, in accordance with various aspects of the present disclosure.

FIG. 4 is a diagram illustrating an example 400 of selecting SSB resources according to mobility state, in accordance with various aspects of the present disclosure. As shown in FIG. 4, example 400 includes a BS 110a (e.g., a CU), a BS 110d (e.g., a DU), and a UE 120e. In some aspects, BS 110a may be an IAB-donor and BS 110d may be an IAB-node. In some aspects, actions described herein as being performed by UE 120e may be performed by BS 110d (e.g., a mobile termination component of an IAB-node).

As shown in FIG. 4, and by reference number 410, BS 110d may provide an indication of a mobility state of BS 110d (e.g., a mobility state of a cell associated with BS 110d) to BS 110a. For example, BS 110d may transmit information that identifies a mobility state of BS 110d. As another example, BS 110d may transmit information, such as a speed, a location, and/or the like, of BS 110d, to enable BS 110a to identify a mobility state of BS 110d. In some aspects, BS 110a may be configured with information that identifies a mobility state of BS 110d.

The mobility state may be a stationary mobility state or a mobile mobility state. The mobile mobility state may be a high speed mobility state, a medium speed mobility state, a low speed mobility state, and/or the like. In some aspects, a stationary mobility state may be associated with a speed of zero and a mobile mobility state may be associated with a speed of greater than zero. In some aspects, a low speed mobility state may be associated with a speed that is below a first threshold value and greater than zero, a medium speed mobility state may be associated with a speed that is between the first threshold value and a second threshold value, and a high speed mobility state may be associated with a speed that is above the second threshold value.

In some aspects, the mobility state of BS 110d may be an initial mobility state of BS 110d. Alternatively, the mobility state of BS 110d may be a new mobility state of BS 110d. For example, BS 110d may transition from a stationary mobility state to a mobile mobility state or transition from a high speed mobility state to a low speed mobility state. Accordingly, the indication of a mobility state provided by BS 110d may indicate a change in a mobility state of BS 110d.

As shown by reference number 420, BS 110a may select one or more resources for BS 110d (e.g., one or more resources in which BS 110d is to transmit SSBs) according to the mobility state of BS 110d. For example, BS 110a may select one or more resources for BS 110d based at least in part on the indication of mobility state provided by BS 110d. BS 110a may select resources for BS 110d that do not conflict with resources selected for another BS (e.g., another BS 110d) having a mobility state that is different from BS 110d.

In some aspects, BS 110d may not provide an indication of mobility state to BS 110a, and BS 110d may select one or more resources (e.g., for transmitting SSBs) according to the mobility state of BS 110d. In such a case, BS 110d (e.g., an operations, administration, and maintenance (OAM) component of BS 110*d*) may select the resources according to criteria defined for the mobility state of BS 110*d* in order to avoid selecting resources that conflict with resources selected by another BS (e.g., another BS 110*d*) having a mobility state that is different from BS 110*d*.

In some aspects, one of BS 110*a* or BS 110*d* may be chosen to select the resources based at least in part on a type of SSBs that are to be transmitted in the selected resources. For example, resources that are to be used by BS 110*d* for transmitting SSBs relating to neighbor measurement or peer discovery (collectively referred to herein as radio resource management (RRM) SSBs) may be selected by BS 110*a*. As another example, resources that are to be used by BS 110*d* for transmitting cell-defining SSBs (CD-SSBs) may be selected by BS 110*d*.

In some aspects, the selected resources may be associated with a stationary mobility state or a mobile mobility state. For example, if BS 110*d* has a stationary mobility state, the selected resources may be associated with a stationary mobility state. As another example, if BS 110*d* has a mobile mobility state, the selected resources may be associated with a mobile mobility state. In some aspects, the selected resources may be associated with a type of the mobile mobility state. For example, the selected resources may be associated with a low mobility state, a medium mobility state, a high mobility state, and/or the like.

In some aspects, resources selected for a stationary mobility state may be in a different synchronization (sync) raster from resources selected for a mobile mobility state. For example, a first set of resources and a second set of resources that may be used by BS 110*d* for transmitting CD-SSBs may be in different sync rasters according to a mobility state of BS 110*d*. In some aspects, a first sync raster may be assigned to (e.g., dedicated for) a stationary mobility state and a second sync raster may be assigned to (e.g., dedicated for) a mobile mobility state.

In some aspects, resources selected for a stationary mobility state may have a different periodicity and/or a different time offset from resources selected for a mobile mobility state. For example, a first set of resources and a second set of resources that may be used by BS 110*d* for transmitting CD-SSBs may be in the same sync raster but have different periodicities and/or time offsets according to a mobility state of BS 110*d* (e.g., the first set of resources may be time domain multiplexed with the second set of resources). In some aspects, a first periodicity and/or a first time offset may be assigned to a stationary mobility state and a second periodicity and/or a second time offset may be assigned to a mobile mobility state.

In some aspects, resources selected for a stationary mobility state may have a different SSB measurement timing configuration (SMTC) window or a different SSB transmission configuration (STC) window from resources selected for a mobile mobility state. For example, a first set of resources and a second set of resources that may be used by BS 110*d* for transmitting RRM SSBs may be associated with different SMTC windows and/or STC windows according to a mobility state of BS 110*d*. In some aspects, first SMTC windows and/or first STC windows may be assigned to a stationary mobility state and second SMTC windows and/or second STC windows may be assigned to a mobile mobility state.

In some aspects, an SMTC window and/or an STC window associated with a stationary mobility state may be orthogonal in time and/or orthogonal in frequency to an SMTC window and/or an STC window associated with a mobile mobility state. In some aspects, an SMTC of an SMTC window and/or an STC of an STC window associated with a stationary mobility state may be different from an SMTC of an SMTC window and/or an STC of an STC window associated with a mobile mobility state (e.g., the SMTCs may overlap, but identify different time and/or frequency window locations, different window durations, and/or the like). For example, an SMTC of an SMTC window and/or an STC of an STC window associated with a stationary mobility state may identify a PCI list and/or a periodicity different from those identified by an SMTC of an SMTC window and/or an STC of an STC window associated with a mobile mobility state.

As shown by reference number 430, BS 110*a* may provide an indication of the selected resources to BS 110*d*. The indication may enable BS 110*d* to identify the selected resources for transmitting SSBs. In some aspects, such as when BS 110*d* selected (e.g., identified) the resources, BS 110*d* may provide an indication of the selected resources to BS 110*a*. In some cases, the indication may provide a notification of the selected resources to BS 110*a* (e.g., to enable BS 110*a* to avoid selecting the same resources for another BS having a different mobility state). Additionally, or alternatively, the indication may request that BS 110*a* assign the selected resources to BS 110*d*. In such a case, BS 110*a* may assign the selected resources to BS 110*d* (e.g., if the resources do not conflict with resources selected for another BS having a different mobility state) and transmit an indication to BS 110*d* that the selected resources have been assigned to BS 110*d*.

As shown by reference number 440, BS 110*d* may transmit, and UE 120*e* may receive, SSBs in the selected resources. In some aspects, the SSBs may be associated with cell access, cell selection, cell reselection, and/or the like, such as CD-SSBs. For example, BS 110*d* may transmit, and UE 120*e* may receive, CD-SSBs according to a sync raster associated with a mobility state of BS 110*d* (e.g., a mobility state of a cell associated with BS 110*d*). That is, BS 110*d* may transmit CD-SSBs in the selected resources, which correspond to a sync raster associated with the mobility state of BS 110*d*. As another example, BS 110*d* may transmit, and UE 120*e* may receive, CD-SSBs according to a periodicity and/or a time offset associated with a mobility state of BS 110*d* (e.g., a mobility state of a cell associated with BS 110*d*). That is, BS 110*d* may transmit CD-SSBs in the selected resources, which correspond to a periodicity and/or a time offset associated with the mobility state of BS 110*d*.

In some aspects, the SSBs may be associated with neighbor searching, peer discovery, neighbor measurement, and/or the like, such as RRM SSBs. For example, BS 110*d* may transmit RRM SSBs in an STC window associated with a mobility state of BS 110*d*. That is, BS 110*d* may transmit RRM SSBs in the selected resources, which correspond to an STC window associated with the mobility state of BS 110*d*. Moreover, UE 120*e* may receive the RRM SSBs in an SMTC window associated with the mobility state of BS 110*d* (e.g., an SMTC window corresponding to the STC window used to transmit the SSBs).

In this way, PCI collision may be avoided when a mobile network node (e.g., BS 110*d*) is in the same area as a stationary network node while using the same PCI. Moreover, using different resources for a stationary mobility state and a mobile mobility state (e.g., partitioning an SSB space based at least in part on mobility state) permits mobile network nodes and stationary network nodes to be configured differently (e.g., different configurations for beam sweep periodicity, beam width, and/or the like) while avoiding interference. Furthermore, using different resources (e.g., STC windows and/or SMTC windows) for a stationary mobility state and a mobile mobility state permits mobile network nodes and stationary network nodes to use different PCI lists (e.g., neighbor PCI lists). For example, an STC and/or an SMTC of a stationary network node may identify a static PCI list, and an STC and/or an SMTC of a mobile network node may not identify a PCI list or may identify a dynamic PCI list that is updated based on a movement of the mobile network node.

As shown by reference number 450, UE 120e may identify a mobility state of BS 110d based at least in part on the resources that BS 110d used to transmit SSBs and/or the resources in which UE 120e received the SSBs. For example, UE 120e may identify the mobility state of BS 110d based at least in part on a sync raster associated with the resources in which UE 120e received the SSBs. As another example, UE 120e may identify the mobility state of BS 110d based at least in part on a periodicity and/or a time offset associated with the resources in which UE 120e received the SSBs. As a further example, UE 120e may identify the mobility state of BS 110d based at least in part on an SMTC window associated with the resources in which UE 120e received the SSBs.

In some aspects, UE 120e may be configured with information that enables UE 120e to identify a particular mobility state associated with a particular sync raster, periodicity, time offset, SMTC window, and/or the like. For example, the information may indicate that a stationary mobility state is associated with a first time offset and a mobile mobility state is associated with a second time offset.

In some aspects, UE 120e may receive SSBs from a BS of a particular mobility state. For example, UE 120e may determine to receive SSBs from a BS having a stationary mobility state (e.g., in order to communicate via a stationary BS), and may monitor for SSBs in resources associated with a stationary mobility state. As another example, UE 120e may determine to receive SSBs from a BS having a mobile mobility state, and may monitor for SSBs in resources associated with a mobile mobility state.

In some aspects, UE 120e may perform measurement of the received SSBs as part of an initial access procedure, a cell reselection procedure, a neighbor-cell search procedure, a peer discovery procedure, a measurement procedure, and/or the like. In some aspects, UE 120e may transmit measurement reports based on measurements of the received SSBs. For example, UE 120e may transmit a measurement report to BS 110d that identifies one or more measurements (e.g., reference signal received power (RSRP) measurements, reference signal received quality (RSRQ) measurements, signal-to-noise ratio (SNR) measurements, signal-to-interference-plus-noise ratio (SINR) measurements, and/or the like) of the SSBs. In some aspects, UE 120e may be configured with different measurement configurations for a stationary mobility state and a mobile mobility state. For example, if BS 110d has a mobile mobility state, a measurement configuration may identify that UE 120e is to report measurements more frequently, and if BS 110d has a stationary mobility state, a measurement configuration may identify that UE 120e is to report measurements less frequently.

Figure 5:
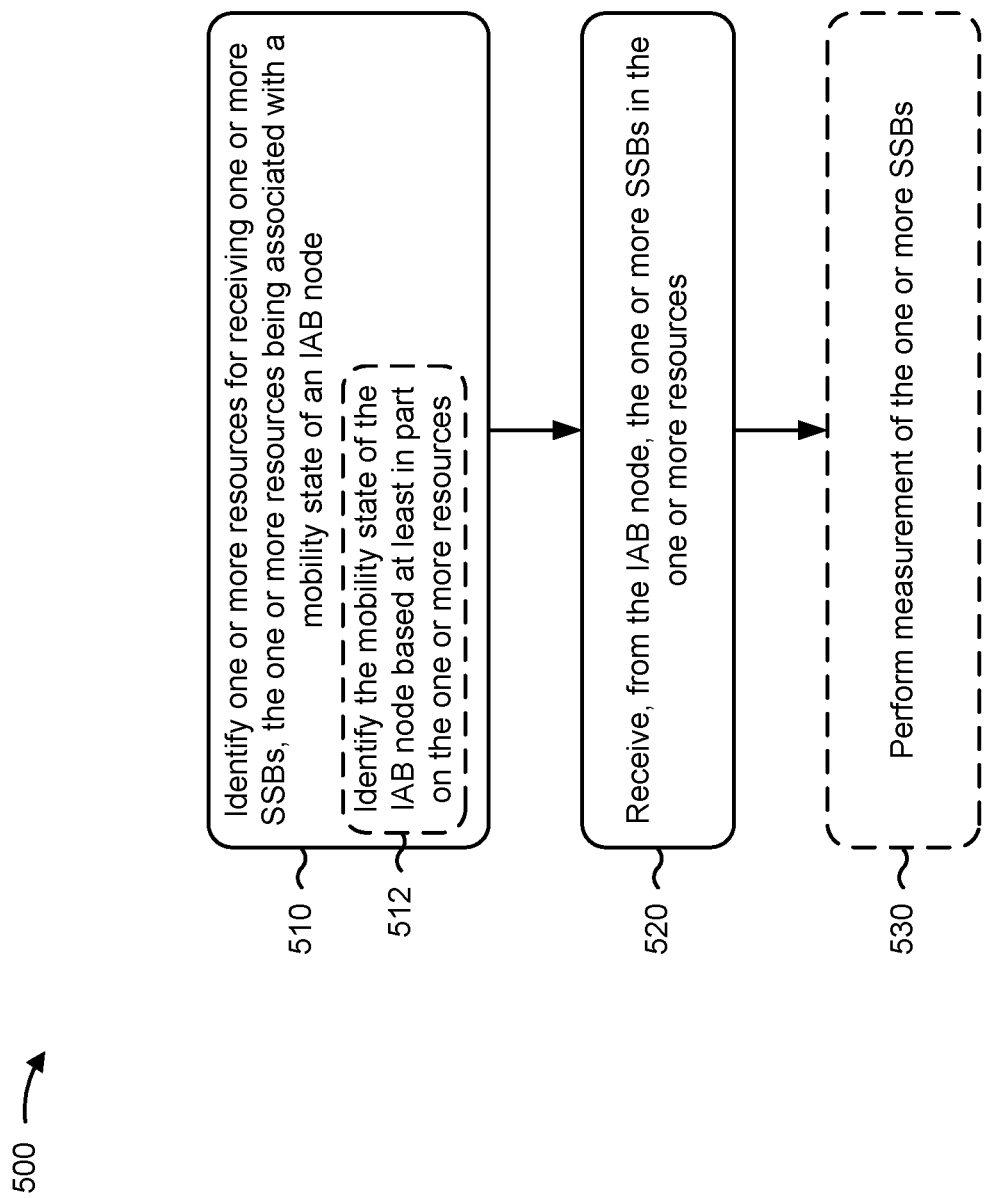
FIGS. 5-7 are diagrams illustrating example processes performed, for example, by a network node, in accordance with various aspects of the present disclosure.

FIG. 5 is a diagram illustrating an example process 500 performed, for example, by a network node, in accordance with various aspects of the present disclosure. Example process 500 is an example where a network node (e.g., BS 110d, UE 120e, an IAB node, apparatus 800, apparatus 900, apparatus 1000, and/or the like) performs operations associated with selecting SSB resources according to mobility state.

As shown in FIG. 5, in some aspects, process 500 may include identifying one or more resources for receiving one or more SSBs, the one or more resources being associated with a mobility state of an IAB node (block 510). For example, the network node (e.g., using antenna 234, DEMOD 232, MIMO detector 236, receive processor 238, controller/processor 240, antenna 252, DEMOD 254, MIMO detector 256, receive processor 258, controller/processor 280, identification/selection component 808, and/or the like) may identify one or more resources for receiving one or more SSBs, the one or more resources being associated with a mobility state of an IAB node, as described above.

In some aspects, process 500 may include identifying the mobility state of the IAB node based at least in part on the one or more resources (block 512). For example, the network node (e.g., using controller/processor 280, memory 282, identification/selection component 808, and/or the like) may identify the mobility state of the IAB node based at least in part on the one or more resources, as described above.

As further shown in FIG. 5, in some aspects, process 500 may include receiving, from the IAB node, the one or more SSBs in the one or more resources (block 520). For example, the network node (e.g., using antenna 234, DEMOD 232, MIMO detector 236, receive processor 238, controller/processor 240, antenna 252, DEMOD 254, MIMO detector 256, receive processor 258, controller/processor 280, reception component 802, and/or the like) may receive, from the IAB node, the one or more SSBs in the one or more resources, as described above.

As further shown in FIG. 5, in some aspects, process 500 may include performing measurement of the one or more SSBs (block 530). For example, the network node (e.g., using controller/processor 280, memory 282, measurement component 810, and/or the like) may perform measurement of the one or more SSBs, as described above.

Process 500 may include additional aspects, such as any single aspect or any combination of aspects described below and/or in connection with one or more other processes described elsewhere herein.

In a first aspect, the one or more SSBs are received as part of at least one of an access procedure, a cell selection procedure, a measurement procedure, or a peer discovery procedure.

In a second aspect, alone or in combination with the first aspect, the one or more resources are one or more first resources associated with a first mobility state or one or more second resources associated with a second mobility state. In a third aspect, alone or in combination with one or more of the first and second aspects, the first mobility state is a stationary mobility state and the second mobility state is a mobile mobility state.

In a fourth aspect, alone or in combination with one or more of the first through third aspects, the one or more resources are received according to a first synchronization raster associated with the first mobility state or a second synchronization raster associated with the second mobility state. In a fifth aspect, alone or in combination with one or more of the first through fourth aspects, the one or more resources are received according to at least one of a first periodicity or a first time offset associated with the first mobility state or at least one of a second periodicity or a second time offset associated with the second mobility state.

In a sixth aspect, alone or in combination with one or more of the first through fifth aspects, the one or more resources are received according to a first SMTC window associated with the first mobility state or a second SMTC window associated with the second mobility state. In a seventh aspect, alone or in combination with one or more of the first through sixth aspects, the first SMTC window is at least one of orthogonal in time or orthogonal in frequency to the second SMTC window. In an eighth aspect, alone or in combination with one or more of the first through seventh aspects, an SMTC of the first SMTC window identifies at least one of a first PCI list or a first periodicity that is different from a second PCI list or a second periodicity identified by an SMTC of the second SMTC window.

In a ninth aspect, alone or in combination with one or more of the first through eighth aspects, the one or more resources are identified as being associated with the mobility state based at least in part on a synchronization raster associated with the one or more resources. In a tenth aspect, alone or in combination with one or more of the first through ninth aspects, the one or more resources are identified as being associated with the mobility state based at least in part on at least one of a periodicity or a time offset associated with the one or more resources. In an eleventh aspect, alone or in combination with one or more of the first through tenth aspects, the one or more resources are identified as being associated with the mobility state based at least in part on an SMTC window associated with the one or more resources.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
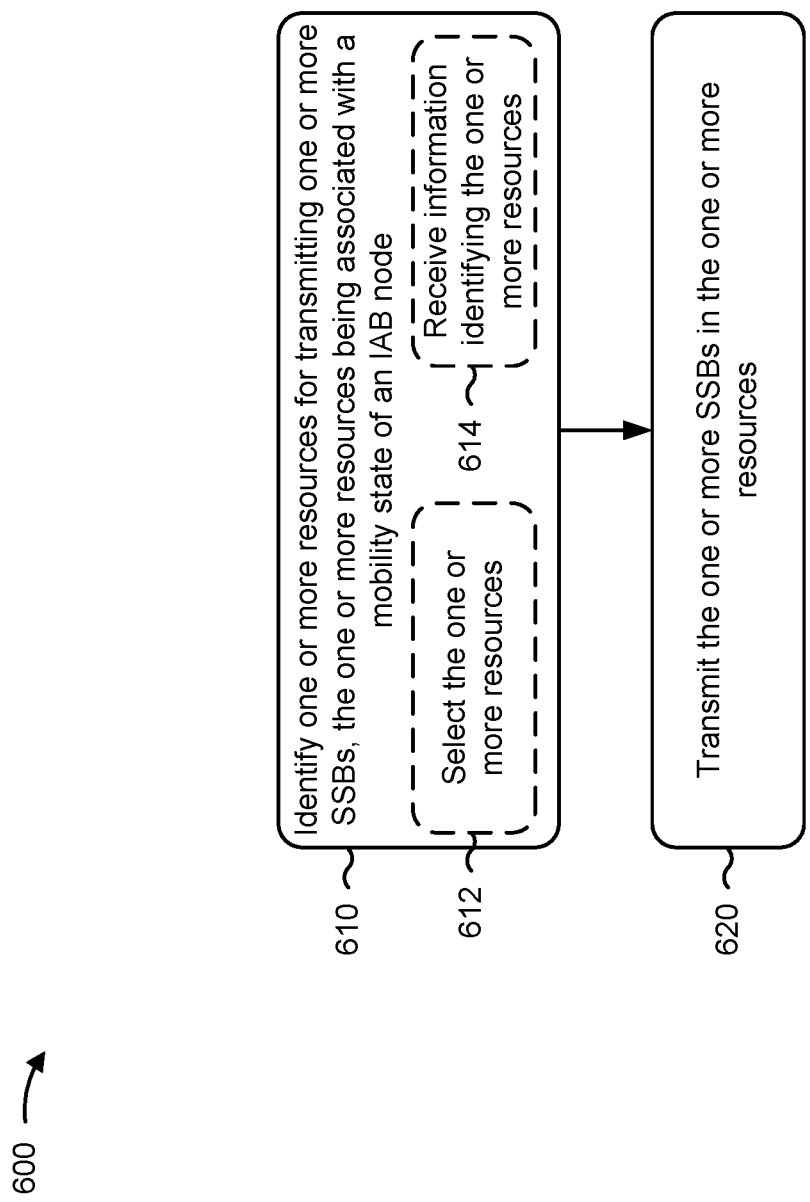

FIG. 6 is a diagram illustrating an example process 600 performed, for example, by a network node, in accordance with various aspects of the present disclosure. Example process 600 is an example where a network node (e.g., BS 110a, BS 110d, an IAB node, an IAB donor, apparatus 800, apparatus 900, apparatus 1000, and/or the like) performs operations associated with selecting SSB resources according to mobility state.

As shown in FIG. 6, in some aspects, process 600 may include identifying one or more resources for transmitting one or more SSBs, the one or more resources being associated with a mobility state of an IAB node (block 610). For example, the network node (e.g., using controller/processor 240, memory 242, identification/selection component 808, and/or the like) may identify one or more resources for transmitting one or more SSBs, the one or more resources being associated with a mobility state of an IAB node, as described above.

In some aspects, process 600 may include selecting the one or more resources (block 612). For example, the network node (e.g., using controller/processor 240, memory 242, identification/selection component 808, and/or the like) may select the one or more resources, as described above. In some aspects, process 600 may include receiving, from another network node, information identifying the one or more resources (block 614). For example, the network node (e.g., using antenna 234, DEMOD 232, MIMO detector 236, receive processor 238, controller/processor 240, reception component 802, and/or the like) may receive, from another network node, information identifying the one or more resources, as described above.

As further shown in FIG. 6, in some aspects, process 600 may include transmitting the one or more SSBs in the one or more resources (block 620). For example, the network node (e.g., using transmit processor 220, TX MIMO processor 230, MOD 232, antenna 234, controller/processor 240, transmission component 804, and/or the like) may transmit the one or more SSBs in the one or more resources, as described above.

Process 600 may include additional aspects, such as any single aspect or any combination of aspects described below and/or in connection with one or more other processes described elsewhere herein.

In a first aspect, the one or more SSBs are associated with at least one of cell access, cell selection, neighbor measurement, or peer discovery.

In a second aspect, alone or in combination with the first aspect, the one or more resources are one or more first resources associated with a first mobility state or one or more second resources associated with a second mobility state. In a third aspect, alone or in combination with one or more of the first and second aspects, the first mobility state is a stationary mobility state and the second mobility state is a mobile mobility state.

In a fourth aspect, alone or in combination with one or more of the first through third aspects, the one or more resources are transmitted according to a first synchronization raster associated with the first mobility state or a second synchronization raster associated with the second mobility state. In a fifth aspect, alone or in combination with one or more of the first through fourth aspects, the one or more resources are transmitted according to at least one of a first periodicity or a first time offset associated with the first mobility state or at least one of a second periodicity or a second time offset associated with the second mobility state.

In a sixth aspect, alone or in combination with one or more of the first through fifth aspects, the one or more resources are transmitted in a first STC window associated with the first mobility state or a second STC window associated with the second mobility state. In a seventh aspect, alone or in combination with one or more of the first through sixth aspects, the first STC window is at least one of orthogonal in time or orthogonal in frequency to the second STC window. In an eighth aspect, alone or in combination with one or more of the first through seventh aspects, an STC of the first STC window identifies at least one of a first PCI list or a first periodicity that is different from a second PCI list or a second periodicity identified by an STC of the second STC window.

In a ninth aspect, alone or in combination with one or more of the first through eighth aspects, process 600 further includes receiving, from another network node, information identifying the one or more resources, and the one or more resources are selected by the other network node. In a tenth aspect, alone or in combination with one or more of the first through ninth aspects, process 600 further includes selecting the one or more resources.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
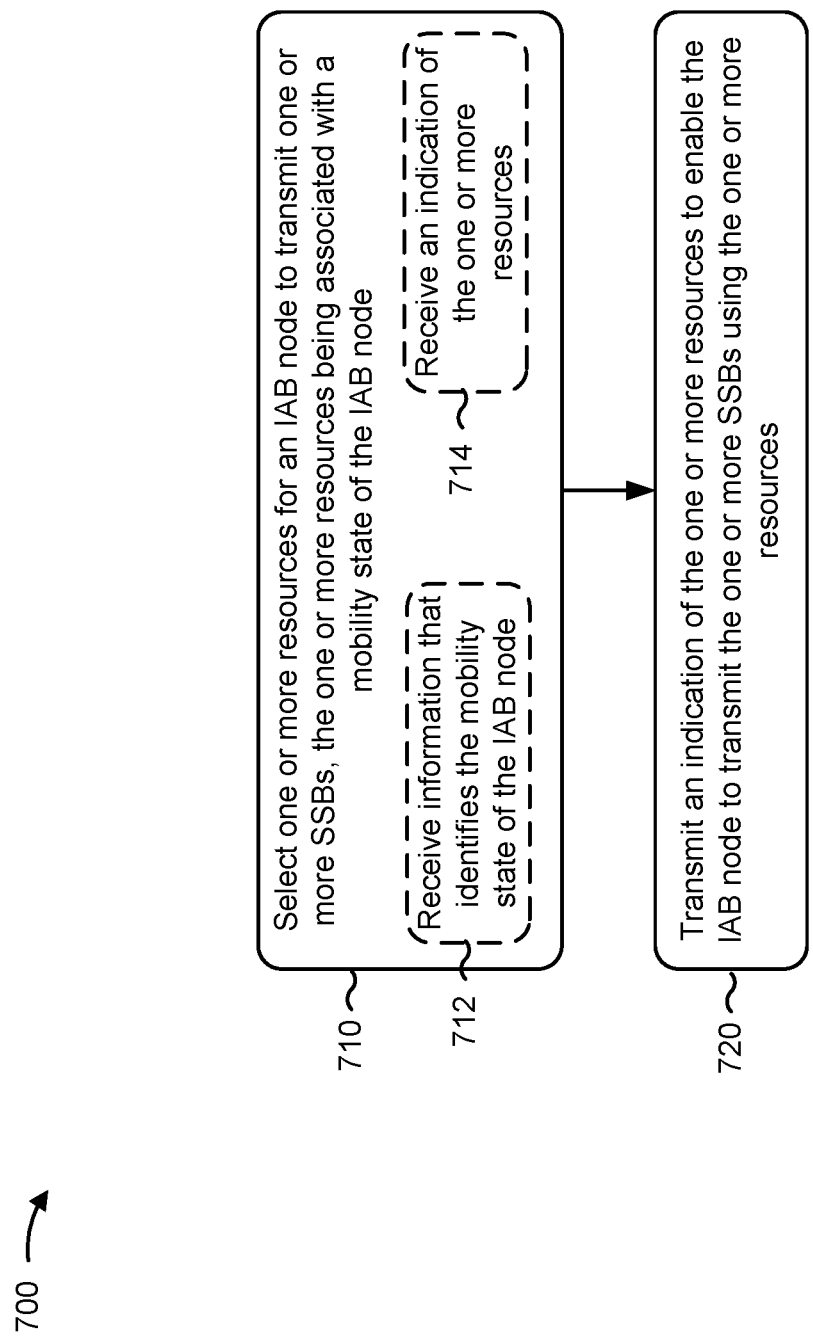

FIG. 7 is a diagram illustrating an example process 700 performed, for example, by a network node, in accordance with various aspects of the present disclosure. Example process 700 is an example where a network node (e.g., BS 110a, an IAB node, an IAB donor, apparatus 800, apparatus 900, apparatus 1000, and/or the like) performs operations associated with selecting SSB resources according to mobility state.

As shown in FIG. 7, in some aspects, process 700 may include selecting one or more resources for an IAB node to transmit one or more SSBs, the one or more resources being associated with a mobility state of the IAB node (block 710). For example, the network node (e.g., using controller/processor 240, memory 242, identification/selection component 808, and/or the like) may select one or more resources for an IAB node to transmit one or more SSBs, the one or more resources being associated with a mobility state of the IAB node, as described above.

In some aspects, process 700 may include receiving, from the IAB node, information that identifies the mobility state of the IAB node (block 712). For example, the network node (e.g., using antenna 234, DEMOD 232, MIMO detector 236, receive processor 238, controller/processor 240, reception component 802, and/or the like) may receive, from the IAB node, information that identifies the mobility state of the IAB node, as described above. In some aspects, process 700 may include receiving, from the IAB node, an indication of the one or more resources (block 714). For example, the network node (e.g., using antenna 234, DEMOD 232, MIMO detector 236, receive processor 238, controller/processor 240, reception component 802, and/or the like) may receive, from the IAB node, an indication of the one or more resources.

As further shown in FIG. 7, in some aspects, process 700 may include transmitting an indication of the one or more resources to enable the IAB node to transmit the one or more SSBs using the one or more resources (block 720). For example, the network node (e.g., using controller/processor 240, transmit processor 220, TX MIMO processor 230, MOD 232, antenna 234, transmission component 804, and/or the like) may transmit an indication of the one or more resources to enable the IAB node to transmit the one or more SSBs using the one or more resources, as described above.

Process 700 may include additional aspects, such as any single aspect or any combination of aspects described below and/or in connection with one or more other processes described elsewhere herein.

In a first aspect, the one or more SSBs are associated with at least one of cell access, cell selection, neighbor measurement, or peer discovery.

In a second aspect, alone or in combination with the first aspect, the one or more resources are one or more first resources associated with a first mobility state or one or more second resources associated with a second mobility state. In a third aspect, alone or in combination with one or more of the first and second aspects, the first mobility state is a stationary mobility state and the second mobility state is a mobile mobility state.

In a fourth aspect, alone or in combination with one or more of the first through third aspects, the one or more resources are to be transmitted according to a first synchronization raster associated with the first mobility state or a second synchronization raster associated with the second mobility state. In a fifth aspect, alone or in combination with one or more of the first through fourth aspects, the one or more resources are to be transmitted according to at least one of a first periodicity or a first time offset associated with the first mobility state or at least one of a second periodicity or a second time offset associated with the second mobility state.

In a sixth aspect, alone or in combination with one or more of the first through fifth aspects, the one or more resources are to be transmitted in a first STC window associated with the first mobility state or a second STC window associated with the second mobility state. In a seventh aspect, alone or in combination with one or more of the first through sixth aspects, the first STC window is at least one of orthogonal in time or orthogonal in frequency to the second STC window. In an eighth aspect, alone or in combination with one or more of the first through seventh aspects, an STC of the first STC window identifies at least one of a first PCI list or a first periodicity that is different from a second PCI list or a second periodicity identified by an STC of the second STC window.

In a ninth aspect, alone or in combination with one or more of the first through eighth aspects, process 700 further includes receiving information that identifies the mobility state from the IAB node.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
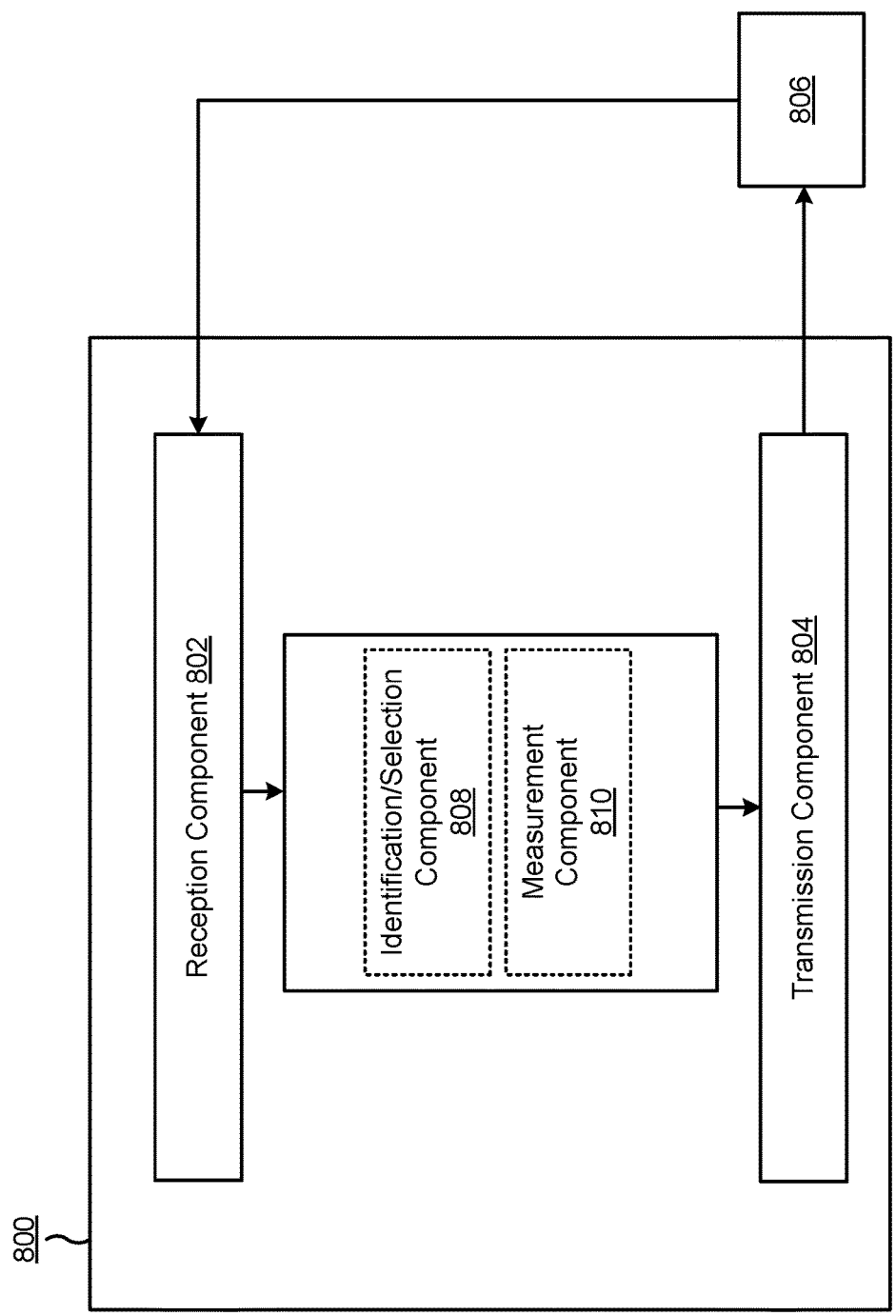
FIGS. 8-10 are examples of apparatuses for wireless communication, in accordance with various aspects of the present disclosure.

FIG. 8 is a block diagram of an example apparatus 800 for wireless communication. The apparatus 800 may be a network node, or a network node may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, an IAB-node, an IAB-donor, a DU, a CU, or another wireless communication device) using the reception component 802 and the transmission component 804. As further shown, the apparatus 800 may include one or more of an identification/selection component 808, a measurement component 810, among other examples. In some aspects, the identification/selection component 808 may include a controller/processor, a memory, a scheduler, a communication unit, or a combination thereof, of the network node described above in connection with FIG. 2. In some aspects, the measurement component 810 may include a controller/processor, a memory, a scheduler, a communication unit, or a combination thereof, of the network node described above in connection with FIG. 2.

In some aspects, the apparatus 800 may include the communication manager 140, the communication manager 150, or the communication manager 160 (not shown). In some aspects, the communication manager 140, the communication manager 150, or the communication manager 160 may include the identification/selection component 808, the measurement component 810, or another component associated with performing operations described herein.

In some aspects, the apparatus 800 may be configured to perform one or more operations described herein in connection with FIG. 4. Additionally or alternatively, the apparatus 800 may be configured to perform one or more processes described herein, such as process 500 of FIG. 5, process 600 of FIG. 6, process 700 of FIG. 7, or a combination thereof.

In some aspects, the communication manager 140, the communication manager 150, the communication manager 160, the identification/selection component 808, and/or the measurement component 810 may be implemented in hardware (e.g., in the circuitry described in connection with FIG. 10). In some aspects, the communication manager 140, the communication manager 150, the communication manager 160, the identification/selection component 808, and/or the measurement component 810 may include a controller/processor, a memory, a scheduler, a communication unit, or a combination thereof, of the network node described above in connection with FIG. 2. Additionally, or alternatively, the communication manager 140, the communication manager 150, the communication manager 160, the identification/selection component 808, and/or the measurement component 810 may be implemented within a controller/processor, a memory, a scheduler, a communication unit, or a combination thereof, of the network node described above in connection with FIG. 2.

In some aspects, the communication manager 140, the communication manager 150, the communication manager 160, the identification/selection component 808, and/or the measurement component 810 may be implemented in code (e.g., as software or firmware stored in a memory), such as the code described in connection with FIG. 10. For example, a component (or a portion of a component) may be implemented as instructions or code stored in a non-transitory computer-readable medium and executable by a controller or a processor to perform the functions or operations of the component. If implemented in code executed by a controller or a processor, the functions of the communication manager 140, the communication manager 150, the communication manager 160, the identification/selection component 808, and/or the measurement component 810 may be executed by a controller/processor, a memory, a scheduler, a communication unit, or a combination thereof, of the network node described above in connection with FIG. 2.

The reception component 802 may provide means for receiving communications, such as reference signals, control information, data communications, or a combination thereof, from the apparatus 806. The reception component 802 may provide received communications to one or more other components of the apparatus 800. In some aspects, the reception component 802 may provide means for performing signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the network node described above in connection with FIG. 2.

The transmission component 804 may provide means for transmitting communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may provide means for performing signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the network node described above in connection with FIG. 2. In some aspects, the transmission component 804 may be collocated with the reception component 802 in a transceiver.

The identification/selection component 808 may provide means for identifying one or more resources for receiving one or more SSBs, the one or more resources being associated with a mobility state of an IAB node. The reception component 802 may provide means for receiving, from the IAB node, the one or more SSBs in the one or more resources. The measurement component 810 may provide means for performing measurement of the one or more SSBs. In some aspects, the identification/selection component 808 may provide means for identifying the mobility state of the IAB node based at least in part on the one or more resources.

The identification/selection component 808 may provide means for identifying one or more resources for transmitting one or more SSBs, the one or more resources being associated with a mobility state of the IAB node. The transmission component 804 may provide means for transmitting the one or more SSBs in the one or more resources. In some aspects, the identification/selection component 808 may provide means for selecting the one or more resources. In some aspects, the reception component 802 may provide means for receiving information identifying the one or more resources.

The identification/selection component 808 may provide means for selecting one or more resources for an IAB node to transmit one or more SSBs, the one or more resources being associated with a mobility state of the IAB node. The transmission component 804 may provide means for transmitting an indication of the one or more resources to enable the IAB node to transmit the one or more SSBs using the one or more resources. In some aspects, the reception component 802 may provide means for receiving information that identifies the mobility state of the IAB node. In some aspects, the reception component 802 may provide means for receiving an indication of the one or more resources.

The quantity and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally or alternatively, a set of (one or more) components shown in FIG. 8 may perform one or more functions described as being performed by another set of components shown in FIG. 8.

Figure 9:
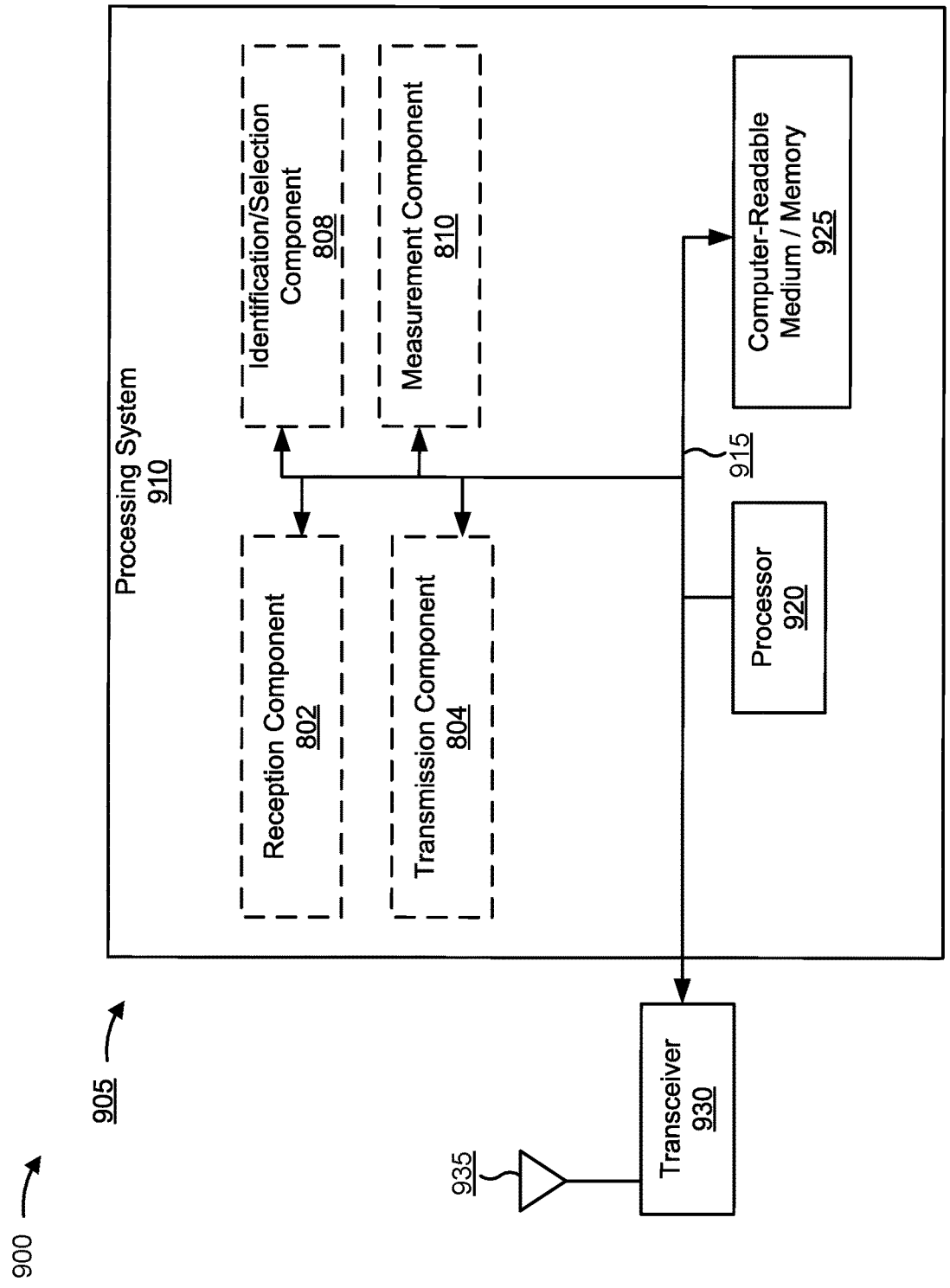

FIG. 9 is a diagram illustrating an example 900 of a hardware implementation for an apparatus 905 employing a processing system 910. The apparatus 905 may be a network node.

The processing system 910 may be implemented with a bus architecture, represented generally by the bus 915. The bus 915 may include any number of interconnecting buses and bridges depending on the specific application of the processing system 910 and the overall design constraints. The bus 915 links together various circuits including one or more processors and/or hardware components, represented by the processor 920, the illustrated components, and the computer-readable medium/memory 925. The bus 915 may also link various other circuits, such as timing sources, peripherals, voltage regulators, power management circuits, and/or the like.

The processing system 910 may be coupled to a transceiver 930. The transceiver 930 is coupled to one or more antennas 935. The transceiver 930 provides a means for communicating with various other apparatuses over a transmission medium. The transceiver 930 receives a signal from the one or more antennas 935, extracts information from the received signal, and provides the extracted information to the processing system 910, specifically the reception component 802. In addition, the transceiver 930 receives information from the processing system 910, specifically the transmission component 804, and generates a signal to be applied to the one or more antennas 935 based at least in part on the received information.

The processing system 910 includes a processor 920 coupled to a computer-readable medium/memory 925. The processor 920 is responsible for general processing, including the execution of software stored on the computer-readable medium/memory 925. The software, when executed by the processor 920, causes the processing system 910 to perform the various functions described herein for any particular apparatus. The computer-readable medium/memory 925 may also be used for storing data that is manipulated by the processor 920 when executing software. The processing system further includes at least one of the illustrated components. The components may be software modules running in the processor 920, resident/stored in the computer readable medium/memory 925, one or more hardware modules coupled to the processor 920, or some combination thereof.

In some aspects, the processing system 910 may be a component of the UE 120 (e.g., UE 120e, among other examples) and may include the memory 282 and/or at least one of the TX MIMO processor 266, the receive processor 258, and/or the controller/processor 280. In some aspects, the apparatus 905 for wireless communication includes means for identifying one or more resources for receiving one or more SSBs, the one or more resources being associated with a mobility state of an IAB node, means for receiving, from the IAB node, the one or more SSBs in the one or more resources, and/or the like. The aforementioned means may be one or more of the aforementioned components of the apparatus 800 and/or the processing system 910 of the apparatus 905 configured to perform the functions recited by the aforementioned means. As described elsewhere herein, the processing system 910 may include the TX MIMO processor 266, the receive processor 258, and/or the controller/processor 280. In one configuration, the aforementioned means may be the TX MIMO processor 266, the receive processor 258, and/or the controller/processor 280 configured to perform the functions and/or operations recited herein.

In some aspects, the processing system 910 may be a component of the base station 110 (e.g., BS 110a, BS 110d, among other examples) and may include the memory 242 and/or at least one of the TX MIMO processor 230, the receive processor 238, and/or the controller/processor 240. In some aspects, the apparatus 905 for wireless communication includes means for identifying one or more resources for transmitting one or more SSBs, the one or more resources being associated with a mobility state of the apparatus, means for transmitting the one or more SSBs in the one or more resources, means for selecting one or more resources for an IAB node to transmit one or more SSBs, the one or more resources being associated with a mobility state of the IAB node, means for transmitting an indication of the one or more resources to enable the IAB node to transmit the one or more SSBs using the one or more resources, and/or the like. The aforementioned means may be one or more of the aforementioned components of the apparatus 800 and/or the processing system 910 of the apparatus 905 configured to perform the functions recited by the aforementioned means. As described elsewhere herein, the processing system 910 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 9 is provided as an example. Other examples may differ from what is described in connection with FIG. 9.

Figure 10:
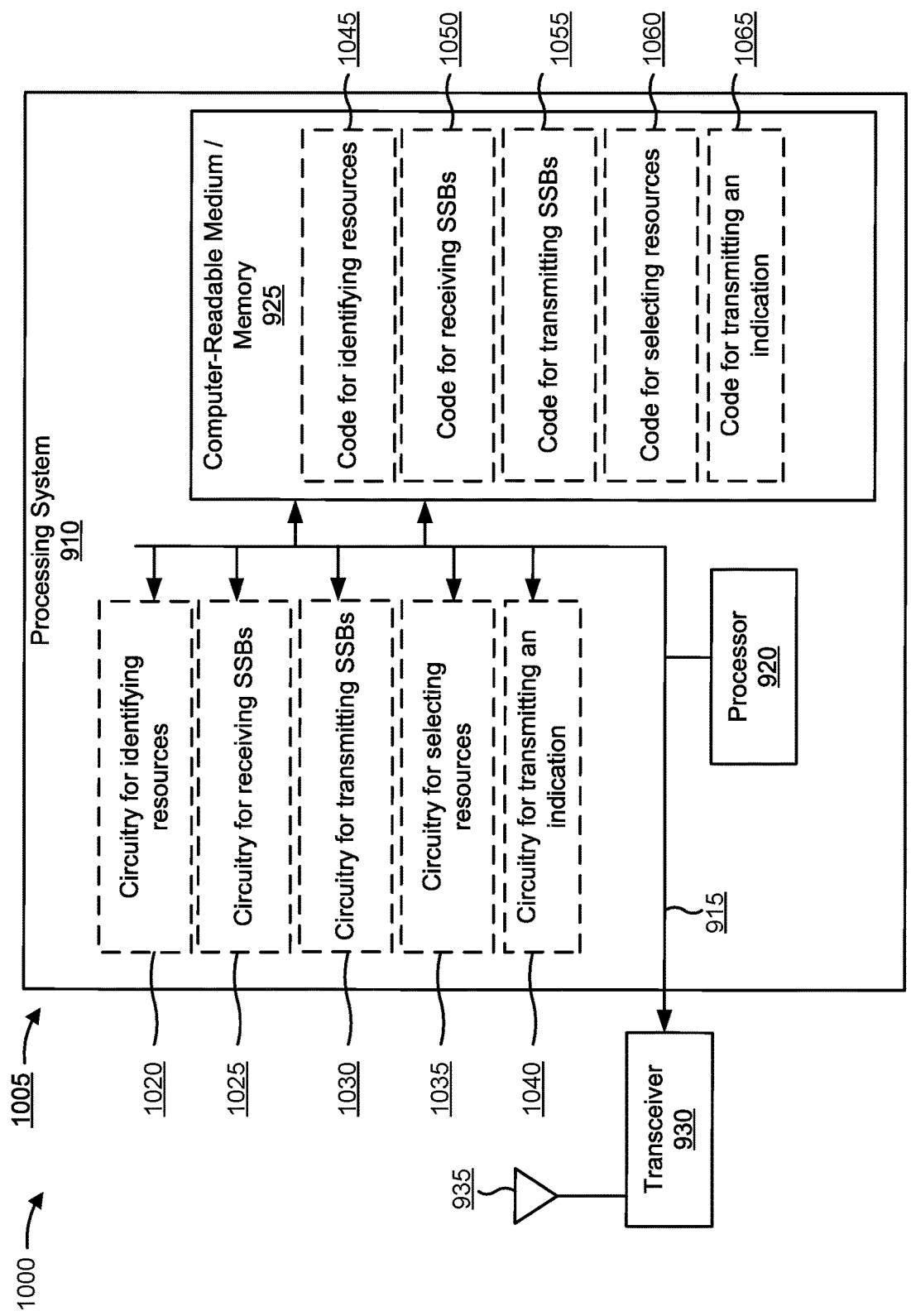

FIG. 10 is a diagram illustrating an example 1000 of an implementation of code and circuitry for an apparatus 1005. The apparatus 1005 may be a network node.

As shown in FIG. 10, the apparatus may include circuitry for identifying resources (circuitry 1020). For example, the circuitry 1020 may provide means for identifying one or more resources for receiving one or more SSBs, the one or more resources being associated with a mobility state of an IAB node. As another example, the circuitry 1020 may provide means for identifying one or more resources for transmitting one or more SSBs, the one or more resources being associated with a mobility state of the apparatus.

As further shown in FIG. 10, the apparatus may include circuitry for receiving SSBs (circuitry 1025). For example, the circuitry 1025 may provide means for receiving, from the IAB node, the one or more SSBs in the one or more resources.

As further shown in FIG. 10, the apparatus may include circuitry for transmitting SSBs (circuitry 1030). For example, the circuitry 1030 may provide means for transmitting the one or more SSBs in the one or more resources.

As further shown in FIG. 10, the apparatus may include circuitry for selecting resources (circuitry 1035). For example, the circuitry 1035 may provide means for selecting one or more resources for an IAB node to transmit one or more SSBs, the one or more resources being associated with a mobility state of the IAB node.

As further shown in FIG. 10, the apparatus may include circuitry for transmitting an indication (circuitry 1040). For example, the circuitry 1040 may provide means for transmitting an indication of the one or more resources to enable the IAB node to transmit the one or more SSBs using the one or more resources.

The circuitry 1020, 1025, 1030, 1035, and/or 1040 may include one or more components of the network node described above in connection with FIG. 2. For example, the circuitry 1020, 1025, 1030, 1035, and/or 1040 may include transmit processor 264, TX MIMO processor 266, MOD 254, DEMOD 254, MIMO detector 256, receive processor 258, antenna 252, controller/processor 280, memory 282, transmit processor 220, TX MIMO processor 230, modulator 232, DEMOD 232, MIMO detector 236, receive processor 238, controller/processor 240, memory 242, scheduler 246, and/or antenna 234.

As further shown in FIG. 10, the apparatus may include, stored in computer-readable medium 925, code for identifying resources (code 1045). For example, the code 1045, when executed by the processor 920, may cause the apparatus to identify one or more resources for receiving one or more SSBs, the one or more resources being associated with a mobility state of an IAB node. As another example, the code 1045, when executed by the processor 920, may cause the apparatus to identify one or more resources for transmitting one or more SSBs, the one or more resources being associated with a mobility state of the apparatus.

As further shown in FIG. 10, the apparatus may include, stored in computer-readable medium 925, code for receiving SSBs (code 1050). For example, the code 1050, when executed by the processor 920, may cause the apparatus to receive, from the IAB node, the one or more SSBs in the one or more resources.

As further shown in FIG. 10, the apparatus may include, stored in computer-readable medium 925, code for transmitting SSBs (code 1055). For example, the code 1055, when executed by the processor 920, may cause the apparatus to transmit the one or more SSBs in the one or more resources.

As further shown in FIG. 10, the apparatus may include, stored in computer-readable medium 925, code for selecting resources (code 1060). For example, the code 1060, when executed by the processor 920, may cause the apparatus to select one or more resources for an IAB node to transmit one or more SSBs, the one or more resources being associated with a mobility state of the IAB node.

As further shown in FIG. 10, the apparatus may include, stored in computer-readable medium 925, code for transmitting an indication (code 1065). For example, the code 1065, when executed by the processor 920, may cause the apparatus to transmit an indication of the one or more resources to enable the IAB node to transmit the one or more SSBs using the one or more resources.

FIG. 10 is provided as an example. Other examples may differ from what is described in connection with FIG. 10.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed at a network node, comprising:
    identifying one or more resources for one or more synchronization signal blocks (SSBs), the one or more resources being associated with a mobility state of an integrated access and backhaul (IAB) node;
    receiving, from the IAB node, the one or more SSBs in the one or more resources; and
    identifying the mobility state of the IAB node based at least in part on the one or more resources being used to receive the one or more SSBs.

2. The method of claim 1, wherein the one or more SSBs are received as part of at least one of an access procedure, a cell selection procedure, a measurement procedure, or a peer discovery procedure.

3. The method of claim 1, wherein the mobility state is a stationary mobility state or a mobile mobility state.

4. The method of claim 1, wherein the one or more SSBs are received according to a synchronization raster associated with the mobility state.

5. The method of claim 1, wherein the one or more SSBs are received according to at least one of a periodicity or a time offset associated with the mobility state.

6. The method of claim 1, wherein the one or more SSBs are received according to a first SSB measurement timing configuration (SMTC) window associated with the mobility state, and
    wherein the first SMTC window is at least one of orthogonal in time or orthogonal in frequency to a second SMTC window associated with a different mobility state.

7. The method of claim 6, wherein an SMTC of the first SMTC window identifies at least one of a first physical cell identifier (PCI) list or a first periodicity that is different from a second PCI list or a second periodicity identified by an SMTC of the second SMTC window.

8. The method of claim 1, wherein identifying the one or more resources comprises:
    identifying the one or more resources based at least in part on:
        a synchronization raster associated with the one or more resources,
        at least one of a periodicity or a time offset associated with the one or more resources, or an SSB measurement timing configuration (SMTC) window associated with the one or more resources.

9. A method of wireless communication performed at an integrated access and backhaul (IAB) node, comprising:
transmitting, to a central unit (CU), an indication of a mobility state of the IAB node;
receiving, from the CU, an indication of one or more resources for one or more synchronization signal blocks (SSBs), the one or more resources being associated with the mobility state of the IAB node; and
transmitting the one or more SSBs in the one or more resources.

10. The method of claim 9, wherein the one or more SSBs are associated with at least one of cell access, cell selection, neighbor measurement, or peer discovery.

11. The method of claim 9, wherein the mobility state is a stationary mobility state or a mobile mobility state.

12. The method of claim 9, wherein the one or more SSBs are transmitted according to a synchronization raster associated with the mobility state.

13. The method of claim 9, wherein the one or more SSBs are transmitted according to at least one of a periodicity or a time offset associated with the mobility state.

14. The method of claim 9, wherein the one or more SSBs are transmitted in a first SSB transmission configuration (STC) window associated with the mobility state, and
wherein the first STC window is at least one of orthogonal in time or orthogonal in frequency to a second STC window associated with a different mobility state.

15. The method of claim 14, wherein an STC of the first STC window identifies at least one of a first physical cell identifier (PCI) list or a first periodicity that is different from a second PCI list or a second periodicity identified by an STC of the second STC window.

16. The method of claim 9,
wherein the one or more resources are selected by the CU.

17. A method of wireless communication performed at a network node, comprising:
receiving, from a distributed unit (DU) of an integrated access and backhaul (IAB) node, an indication of a mobility state of the IAB node;
selecting one or more resources for the IAB node to transmit one or more synchronization signal blocks (SSBs) based on the mobility state of the IAB node; and
transmitting, to the DU, an indication of the one or more resources to enable the IAB node to transmit the one or more SSBs using the one or more resources.

18. The method of claim 17, wherein the one or more SSBs are associated with at least one of cell access, cell selection, neighbor measurement, or peer discovery.

19. The method of claim 17, wherein the mobility state is a stationary mobility state or a mobile mobility state.

20. The method of claim 17, wherein the one or more SSBs are transmitted according to a synchronization raster associated with the mobility state.

21. The method of claim 17, wherein the one or more SSBs are transmitted according to at least one of a periodicity or a time offset associated with the mobility state.

22. The method of claim 17, wherein the one or more SSBs are transmitted according to a first SSB transmission configuration (STC) window associated with the mobility state, and
wherein the first STC window is at least one of orthogonal in time or orthogonal in frequency to a second STC window associated with a different mobility state.

23. The method of claim 22, wherein an STC of the first STC window identifies at least one of a first physical cell identifier (PCI) list or a first periodicity that is different from a second PCI list or a second periodicity identified by an STC of the second STC window.

24. A network node for wireless communication, comprising:
a memory; and
one or more processors, coupled to the memory, configured to:
identify one or more resources for one or more synchronization signal blocks (SSBs), the one or more resources being associated with a mobility state of an integrated access and backhaul (IAB) node;
receive, from the IAB node, the one or more SSBs in the one or more resources; and
identify the mobility state of the IAB node based at least in part on the one or more resources being used to receive the one or more SSBs.

25. The network node of claim 24, wherein the mobility state is a stationary mobility state or a mobile mobility state.

26. The network node of claim 24, wherein the one or more SSBs are received according to a synchronization raster associated with the mobility state.

27. The network node of claim 24, wherein the one or more SSBs are received according to at least one of a periodicity or time offset associated with the mobility state.

28. The network node of claim 24, wherein the one or more SSBs are received according to a first SSB measurement timing configuration (SMTC) window associated with the mobility state, and
wherein the first SMTC window is at least one of orthogonal in time or orthogonal in frequency to a second SMTC window associated with a different mobility state.

29. A non-transitory computer-readable medium storing a set of instructions for wireless communication, the set of instructions comprising:
one or more instructions that, when executed by one or more processors of a network node, cause the network node to:
identify one or more resources for one or more synchronization signal blocks (SSBs), the one or more resources being associated with a mobility state of an integrated access and backhaul (IAB) node;
receive, from the TAB node, the one or more SSBs in the one or more resources; and
identify the mobility state of the TAB node based at least in part on the one or more resources being used to receive the one or more SSBs.

30. The non-transitory computer-readable medium of claim 29, wherein the mobility state is a stationary mobility state or a mobile mobility state.

31. The non-transitory computer-readable medium of claim 29, wherein the one or more SSBs are received according to a synchronization raster associated with the mobility state.

32. The non-transitory computer-readable medium of claim 29, wherein the one or more SSBs are received according to at least one of a periodicity or time offset associated with the mobility state.

33. The non-transitory computer-readable medium of claim 29, wherein the one or more SSBs are received according to a first SSB measurement timing configuration (SMTC) window associated with the mobility state, and
wherein the first SMTC window is at least one of orthogonal in time or orthogonal in frequency to a second SMTC window associated with a different mobility state.

29

34. An integrated access and backhaul (IAB) node for wireless communication, comprising:
a memory; and
one or more processors, coupled to the memory, configured to:
transmit, to a central unit (CU), an indication of a mobility state of the TAB node;
receive, from the CU, an indication of one or more resources for one or more synchronization signal blocks (SSBs), the one or more resources being associated with the mobility state of the TAB node; and
transmit the one or more SSBs in the one or more resources.

35. The IAB node of claim 34, wherein the mobility state is a stationary mobility state or a mobile mobility state.

36. The IAB node of claim 34, wherein the one or more SSBs are transmitted according to a synchronization raster associated with the mobility state.

37. The IAB node of claim 34, wherein the one or more SSBs are transmitted according to at least one of a periodicity or time offset associated with the mobility state.

38. The IAB node of claim 34, wherein the one or more SSBs are transmitted in a first SSB transmission configuration (STC) window associated with the mobility state, and
wherein the first STC window is at least one of orthogonal in time or orthogonal in frequency to a second STC window associated with a different mobility state.

39. A non-transitory computer-readable medium storing a set of instructions for wireless communication, the set of instructions comprising:
one or more instructions that, when executed by one or more processors of an integrated access and backhaul (IAB) node, cause the IAB node to:
transmit, to a central unit (CU), an indication of a mobility state of the IAB node;
receive, from the CU, an indication of one or more resources for one or more synchronization signal blocks (SSBs), the one or more resources being associated with the mobility state of the IAB node; and
transmit the one or more SSBs in the one or more resources.

40. The non-transitory computer-readable medium of claim 39, wherein the mobility state is a stationary mobility state or a mobile mobility state.

41. The non-transitory computer-readable medium of claim 39, wherein the one or more SSBs are transmitted according to a synchronization raster associated with the mobility state.

42. The non-transitory computer-readable medium of claim 39, wherein the one or more SSBs are transmitted according to at least one of a periodicity or time offset associated with the mobility state.

43. The non-transitory computer-readable medium of claim 39, wherein the one or more SSBs are transmitted in a first SSB transmission configuration (STC) window associated with the mobility state, and
wherein the first STC window is at least one of orthogonal in time or orthogonal in frequency to a second STC window associated with a different mobility state.

44. A network node for wireless communication, comprising:

30 a memory; and
one or more processors, coupled to the memory, configured to:
receive, from a distributed unit (DU) of an integrated access and backhaul (TAB) node, an indication of a mobility state of the IAB node;
select one or more resources for the IAB node to transmit one or more synchronization signal blocks (SSBs) based on the mobility state of the IAB node; and
transmit, to the DU, an indication of the one or more resources to enable the IAB node to transmit the one or more SSBs using the one or more resources.

45. The network node of claim 44, wherein the mobility state is a stationary mobility state or a mobile mobility state.

46. The network node of claim 44, wherein the one or more SSBs are transmitted according to a synchronization raster associated with the mobility state.

47. The network node of claim 44, wherein the one or more SSBs are transmitted according to at least one of a periodicity or time offset associated with the mobility state.

48. The network node of claim 44, wherein the one or more SSBs are transmitted in a first SSB transmission configuration (STC) window associated with the mobility state, and
wherein the first STC window is at least one of orthogonal in time or orthogonal in frequency to a second STC window associated with a different mobility state.

49. A non-transitory computer-readable medium storing a set of instructions for wireless communication, the set of instructions comprising:
one or more instructions that, when executed by one or more processors of a network node, cause the network node to:
receive, from a distributed unit (DU) of an integrated access and backhaul (TAB) node, an indication of a mobility state of the TAB node;
select one or more resources for the TAB node to transmit one or more synchronization signal blocks (SSBs) based on the mobility state of the TAB node; and
transmit, to the DU, an indication of the one or more resources to enable the TAB node to transmit the one or more SSBs using the one or more resources.

50. The non-transitory computer-readable medium of claim 49, wherein the mobility state is a stationary mobility state or a mobile mobility state.

51. The non-transitory computer-readable medium of claim 49, wherein the one or more SSBs are transmitted according to a synchronization raster associated with the mobility state.

52. The non-transitory computer-readable medium of claim 49, wherein the one or more SSBs are transmitted according to at least one of a periodicity or time offset associated with the mobility state.

53. The non-transitory computer-readable medium of claim 49, wherein the one or more SSBs are transmitted in a first SSB transmission configuration (STC) window associated with the mobility state, and
wherein the first STC window is at least one of orthogonal in time or orthogonal in frequency to a second STC window associated with a different mobility state.

* * * * *